US008159392B2

(12) United States Patent
Jin et al.

(10) Patent No.: US 8,159,392 B2
(45) Date of Patent: *Apr. 17, 2012

(54) FREQUENCY AIDING METHOD AND SYSTEM FOR NAVIGATION SATELLITE RECEIVER WITH CRYSTAL OSCILLATOR FREQUENCY HYSTERESIS

(75) Inventors: Xin Jin, Waterloo (CA); Christopher James Grant, Waterloo (CA); Andrew Jonathan Gilbert Rosselet, Scarborough (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,513

(22) Filed: May 6, 2011

(65) Prior Publication Data
US 2011/0205113 A1 Aug. 25, 2011

Related U.S. Application Data

(63) Continuation of application No. 12/118,040, filed on May 9, 2008, now Pat. No. 7,956,804.

(51) Int. Cl.
*G01S 19/24* (2010.01)
*G01S 19/29* (2010.01)
(52) U.S. Cl. ............... 342/357.63; 342/357.68
(58) Field of Classification Search ............ 342/357.68, 342/357.63, 357.62
See application file for complete search history.

(56) References Cited

U.S. PATENT DOCUMENTS

| | | | |
|---|---|---|---|
| 5,081,431 A | 1/1992 | Kubo et al. | |
| 5,629,708 A | 5/1997 | Rodal et al. | |
| 5,654,718 A * | 8/1997 | Beason et al. | 342/357.62 |
| 5,893,044 A * | 4/1999 | King et al. | 701/214 |
| 6,509,870 B1 * | 1/2003 | Matsushita et al. | 342/357.62 |
| 6,630,872 B1 | 10/2003 | Lanoue et al. | |
| 6,928,275 B1 | 8/2005 | Patrick et al. | |
| 7,010,307 B2 | 3/2006 | Abraham | |

(Continued)

FOREIGN PATENT DOCUMENTS

CA 2406716 A1 11/2001

(Continued)

OTHER PUBLICATIONS

Office Action from corresponding Canadian Patent Application No. 2,665,540 issued Sep. 1, 2011; 3 pages.

(Continued)

*Primary Examiner* — Gregory C Issing
(74) *Attorney, Agent, or Firm* — Ridout & Maybee LLP

(57) ABSTRACT

A method and apparatus for estimating oscillator signal variation due to temperature and for providing an estimated frequency to a GPS receiver in order to assist the GPS receiver to acquire the signals quickly is disclosed. A temperature sensor is closely thermally coupled with the crystal oscillator in the GPS receiver and during GPS tracking mode, when the error in the oscillator signal is known with precision, outer bounds of TCXO frequency at given temperatures are maintained, which may correspond to rising and falling temperature conditions. During acquisition mode, an estimated frequency value is provided to the GPS receiver based on a determined average of these bounds. Optionally, an uncertainty factor associated with the frequency estimated may also be provided. The two bounds take into account the hysteresis effects of the oscillator signal drift due to temperature so that a more accurate initial frequency estimate can be provided to the GPS receiver, thus reducing its average time to first fix.

20 Claims, 10 Drawing Sheets

U.S. PATENT DOCUMENTS

| | | |
|---|---|---|
| 7,148,761 B1 | 12/2006 | Shieh |
| 7,253,767 B1 * | 8/2007 | Junkar et al. ............. 342/357.62 |
| 7,741,995 B2 * | 6/2010 | Maezawa et al. ........ 342/357.62 |
| 7,956,804 B2 * | 6/2011 | Jin et al. ................... 342/357.68 |
| 2003/0068977 A1 | 4/2003 | King |
| 2003/0083814 A1 * | 5/2003 | Gronemeyer ................. 701/213 |
| 2003/0184399 A1 | 10/2003 | Lanoue et al. |
| 2004/0225439 A1 | 11/2004 | Gronemeyer |

FOREIGN PATENT DOCUMENTS

| | | |
|---|---|---|
| CA | 2394234 A1 | 1/2003 |
| EP | 1336859 A2 | 8/2003 |
| WO | 0186316 A2 | 11/2001 |
| WO | 03032516 A1 | 4/2003 |
| WO | 03038464 A | 5/2003 |
| WO | 03038464 A2 | 5/2003 |

OTHER PUBLICATIONS

Filler, Raymonf L., Measurement and Analysis of Thermal Hysteresis in Resonators and TCXO's, 42nd Annual Frequency Control Symposium, 1988, 380-388, US Army Electronics Technology & Devices Laboratory (LABCOM), Fort Monmouth, NJ.

* cited by examiner

1

FREQUENCY AIDING METHOD AND SYSTEM FOR NAVIGATION SATELLITE RECEIVER WITH CRYSTAL OSCILLATOR FREQUENCY HYSTERESIS

RELATED DISCLOSURES

The present application is a continuation of U.S. patent application Ser. No. 12/118,040 filed on May 9, 2008, which is incorporated herein by reference.

FIELD

The present disclosure relates to navigation satellite signal receivers and, more particularly, to a method for reducing frequency uncertainty in frequency aiding for navigation satellite signal receivers using crystal oscillators, with frequency variation due to temperature variation.

BACKGROUND

Many modern wireless handheld communications devices, whether cellular telephone handsets or personal digital assistants (PDAs) are equipped with ancillary features.

One such feature that is gaining popularity is a Global Positioning System (GPS) receiver, whereby the present location of the handset or PDA may be established to within a precision of a few to a few hundred feet and by which a precise map of the immediate vicinity and/or directions from such present location to a desired destination may be provided.

A GPS receiver clock circuit typically uses a crystal oscillator (XO) or temperature compensated crystal oscillator (TCXO) to generate its local clock. These crystal oscillator or TCXO output signals, even with temperature compensation, are subject to variations due to changes in temperature, which may occur as the GPS receiver is moved to different locations, environments and temperatures, or when internal circuits generate heat. The oscillator signal variation in frequency in response to temperature change is complex and not necessarily uniform.

BRIEF DESCRIPTION OF THE DRAWINGS

The embodiments of the present disclosure will now be described by reference to the following figures, in which identical reference numerals in different figures indicate identical elements and in which.

DETAILED DESCRIPTION

Figure 1:
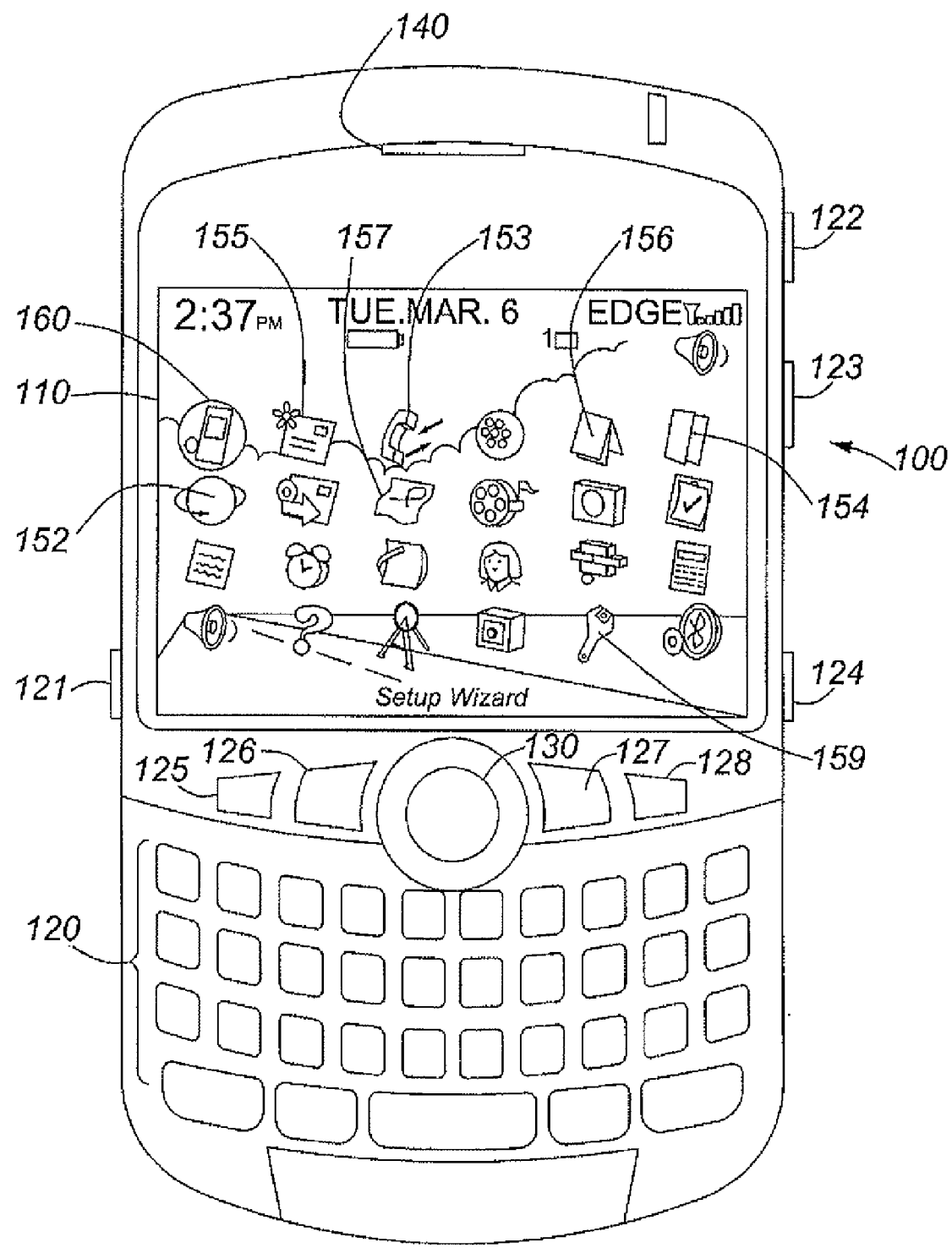
FIG. 1 is a graphical representation of a front view of an example of a mobile communications device to which example embodiments may be applied.

The present disclosure provides a method and apparatus for estimating oscillator signal variation due to temperature and providing an estimated frequency to a GPS receiver, to assist the GPS receiver in acquiring a GPS signal with a possibly inaccurate local clock.

A temperature sensor is closely thermal coupled with the crystal of the GPS receiver crystal oscillator or TCXO and during GPS tracking mode, when the error in the oscillator signal is known with precision, outer bounds of TCXO frequency at given temperatures are maintained.

In many instances, these bounds may correspond to rising and falling temperature conditions. During acquisition mode, an estimated frequency value is provided to the GPS receiver based on these two bounds. Depending on the information stored during the tracking mode, and the existing temperature condition, a weighted average of the bounds may be provided. Optionally, an uncertainty factor associated with the frequency estimate also may be provided. By use of the two bounds to take into account the hysteresis effects of the oscillator signal due to temperature, a more accurate initial frequency estimate can be provided to the GPS receiver, thus reducing its average time to first fix.

The present disclosure also accounts for temperature variations in a TCXO signal due to aging of the oscillator since the temperature response of the device is monitored while the GPS receiver is in tracking mode and the two bounds are continuously updated based on the TCXO behaviour. The rate at which the bounds are updated also may be varied, for example, to ensure new outer bound limits are updated quickly and allow for a reduced impact of new sample points lying between the extremities of the bounds in response to narrower hysteresis effects resulting from certain types of temperature history. The bounds of the oscillator response to temperature variation thus gradually shift over time to match the oscillator's response as it ages, while remaining responsive to large changes in behaviour.

According to a first broad aspect of an embodiment of the present disclosure there is disclosed a navigation satellite receiver, comprising: a crystal oscillator having an operable temperature range, the crystal oscillator adapted to generate an input clock signal having an actual frequency that drifts from a nominal frequency over the operable temperature range within outer bounds that shift over time; a temperature sensor thermally coupled with the crystal oscillator for taking temperature measurements of the crystal oscillator; a navigation platform for receiving a plurality of signals having a known transmit frequency from a plurality of navigation satellites, the platform being capable of operating: in an acquisition mode in which the navigation platform attempts to receive at least one of the plurality of signals from at least one navigation satellite within a frequency search window that relates to a discrepancy between a nominal and actual frequency of the input clock signal; in an operational mode, in which the navigation platform is adapted to receive the plurality of signals from different navigation satellites to obtain a current positional fix for the receiver; and a processor for producing during the operational mode, first and second sets of frequency information, selected from a group consisting of a frequency, frequency difference, frequency offset, frequency error, frequency difference uncertainty, frequency offset uncertainty and frequency error uncertainty, indicative of a discrepancy between the actual and the nominal frequency of the input clock signal determined and applied by the navigation platform, as a function of oscillator temperature measurements taken by the temperature sensor, wherein the first and second sets represent the respective outer bounds of the frequency information; whereby in acquisition mode, the navigation platform is provided a frequency information estimate derived from data stored in the first and/or second sets of frequency information and accessed using a temperature measurement taken by the temperature sensor to take into account a hysteresis effect of the input clock signal due to temperature, and determines an estimated frequency of the input clock signal used to specify the frequency search window for the current temperature measurement, based on the frequency information estimate.

According to a second broad aspect of an embodiment of the present disclosure there is disclosed a method for providing frequency aiding information, for an input clock signal generated by a crystal oscillator having an operable temperature range and having an actual frequency that drifts from a nominal frequency across the operable temperature range within outer bounds that shift over time, to a navigation platform in a navigation satellite receiver comprising a temperature sensor thermally coupled with the crystal oscillator for taking temperature measurements thereof, the navigation platform for receiving a plurality of signals having a known transmit frequency from a plurality of navigation satellites and being capable of operating in an acquisition mode in which the navigation platform attempts to receive at least one of the plurality of signals from at least one navigation satellite within a frequency search window that relates to a discrepancy between nominal and actual frequencies of the input clock signal, and in an operational mode, in which the navigation platform is adapted to receive the plurality of signals from different navigation satellites to obtain a current positional fix for the receiver; the method comprising the actions of: in the operational mode: obtaining frequency data from the navigation platform indicative of a discrepancy between the actual frequency and the nominal frequency of the input clock signal determined and applied by the navigation platform; taking a contemporaneous temperature measurement of the crystal oscillator; and associating the frequency data with the temperature measurement and updating first and/or second sets of frequency information selected from a group consisting of a frequency, frequency difference, frequency offset, frequency error, frequency difference uncertainty, frequency offset uncertainty and frequency error uncertainty with the frequency data, the first and second sets representing the respective outer bounds of frequency information; and in the acquisition mode: taking a current temperature measurement of the crystal oscillator; deriving a frequency information estimate from data stored in the first and/or second sets of frequency information and accessed using ,he current temperature measurement to take into account a hysteresis effect of the input clock signal due to temperature; and determining an estimated frequency of the input clock signal used to specify the frequency search window for the current temperature measurement, based on the frequency information estimate.

According to a third broad aspect of an embodiment of the present disclosure there is disclosed a processor, in a navigation satellite receiver comprising: a crystal oscillator having an operable temperature range, the crystal oscillator adapted to generate an input clock signal having an actual frequency that drifts from a nominal frequency over the operable temperature range within bounds that shift over time; a temperature sensor thermally coupled with the crystal oscillator for taking temperature measurements of the crystal oscillator; a navigation platform for receiving a plurality of signals having a known transmit frequency from a plurality of navigation satellites, the platform being capable of operating: in an acquisition mode in which the navigation platform attempts to receive at least one of the plurality of signals from at least one navigation satellite within a frequency search window that relates to a discrepancy between a nominal and actual frequency of the input clock signal; in an operational mode, in which the navigation platform is adapted to receive the plurality of signals from different navigation satellites to obtain a current positional fix for the receiver; the processor for producing during the operational mode, first and second sets of frequency information, selected from a group consisting of a frequency, frequency difference, frequency offset, frequency error, frequency difference uncertainty, frequency offset uncertainty and frequency error uncertainty, indicative of a discrepancy between the actual and the nominal frequency of the input clock signal determined and applied by the navigation platform, as a function of oscillator temperature measurements taken by the temperature sensor, wherein the first and second sets represent the respective outer bounds of the frequency information; whereby in acquisition mode, the navigation platform is provided a frequency information estimate derived from data stored in the first and/or second sets of frequency information and accessed using a temperature measurement taken by the temperature sensor to take into account a hysteresis effect of the input clock signal due to temperature, and determines an estimated frequency of the input clock signal used to specify the frequency search window for the current temperature measurement, based on the frequency information estimate.

According to a fourth broad aspect of an embodiment of the present disclosure there is disclosed a computer-readable medium in a processor, in a navigation satellite receiver comprising: a crystal oscillator having an operable temperature range, the crystal oscillator adapted to generate an input clock signal having an actual frequency that drifts from a nominal frequency over the operable temperature range within outer bounds that shift over time; a temperature sensor thermally coupled with the crystal oscillator for taking temperature measurements of the crystal oscillator; a navigation platform for receiving a plurality of signals having a known transmit frequency from a plurality of navigation satellites, the platform being capable of operating: in an acquisition mode in which the navigation platform attempts to receive at least one of the plurality of signals from at least one navigation satellite within a frequency search window that relates to a discrepancy between a nominal and actual frequency of the input clock signal; in an operational mode, in which the navigation platform is adapted to receive the plurality of signals from different navigation satellites to obtain a current positional fix for the receiver; the medium having stored thereon, computer-readable and computer-executable instructions which, when executed by the processor, cause the processor to perform acts comprising: a. in the operational mode: i. obtaining frequency data from the navigation platform indicative of a discrepancy between the actual frequency and the nominal frequency of the input clock signal and determined and applied internally by the navigation platform; ii. taking a contemporaneous temperature measurement of the crystal oscillator; and iii. associating the frequency data with the temperature measurement and updating first and/or second sets of frequency information selected from a group consisting of a frequency, frequency difference, frequency offset, frequency error, frequency difference uncertainty, frequency offset uncertainty and frequency error uncertainty, with the frequency data, the first and/or second sets representing the respective outer bounds of frequency information; and b. in the acquisition mode: i. taking a current temperature measurement of the crystal oscillator; ii. deriving a frequency information estimate from data stored in the first and/or second sets of frequency information and accessed using the current temperature measurement to take into account a hysteresis effect of the input clock signal due to temperature; and iii. determining an estimated frequency of the input clock signal used to specify the frequency search window for the current temperature measurement, based on the frequency information estimate.

The present disclosure will now be described for the purposes of illustration only, in conjunction with certain embodiments shown in the enclosed drawings.

The Communications Device

Referring now to the drawings, FIG. 1 is a graphical representation of a front view of an example of an electronic communications device 100 to which example embodiments described herein can be applied. The communications device 100 is a two-way mobile communications device having electronic messaging communications capabilities and possibly also voice communications capabilities. Depending on the functionality provided by the communications device 100, in various embodiments the communications device 100 may be a data communications device, a multiple-mode communications device configured for both data and voice communication, a mobile telephone, a PDA enabled for wireless communications, a computer system with a wireless modem or wireless network card, or a computer or phone device with a fixed connection to a network, among other things. The communications device 100 is, in at least one example embodiment, a handheld device having a casing or housing that is dimensioned to fit into a purse, pocket or belt-mounted device holster.

The communications device 100 includes a display screen 110, an alphanumeric keyboard or keypad 120, optionally one or more non-keyboard inputs, such as buttons 121-128 and/or a rotatable input device such as a trackball 130 or scrollwheel (not shown) and a speaker 140. In some example embodiments keys in the keyboard 120 may contain one or more letters aligned in a QWERTY layout. In some embodiments the keys in the keyboard 120 may not be actual physical keys but may be virtual keys displayed on a touch screen display. In some example embodiments, the keyboard 120 includes a QWERTZ layout, an AZERTY layout, a Dvorak layout, or the like. In some example embodiments, the keyboard 120 layout has reduced keys, such as a reduced QWERTY layout.

Figure 2:
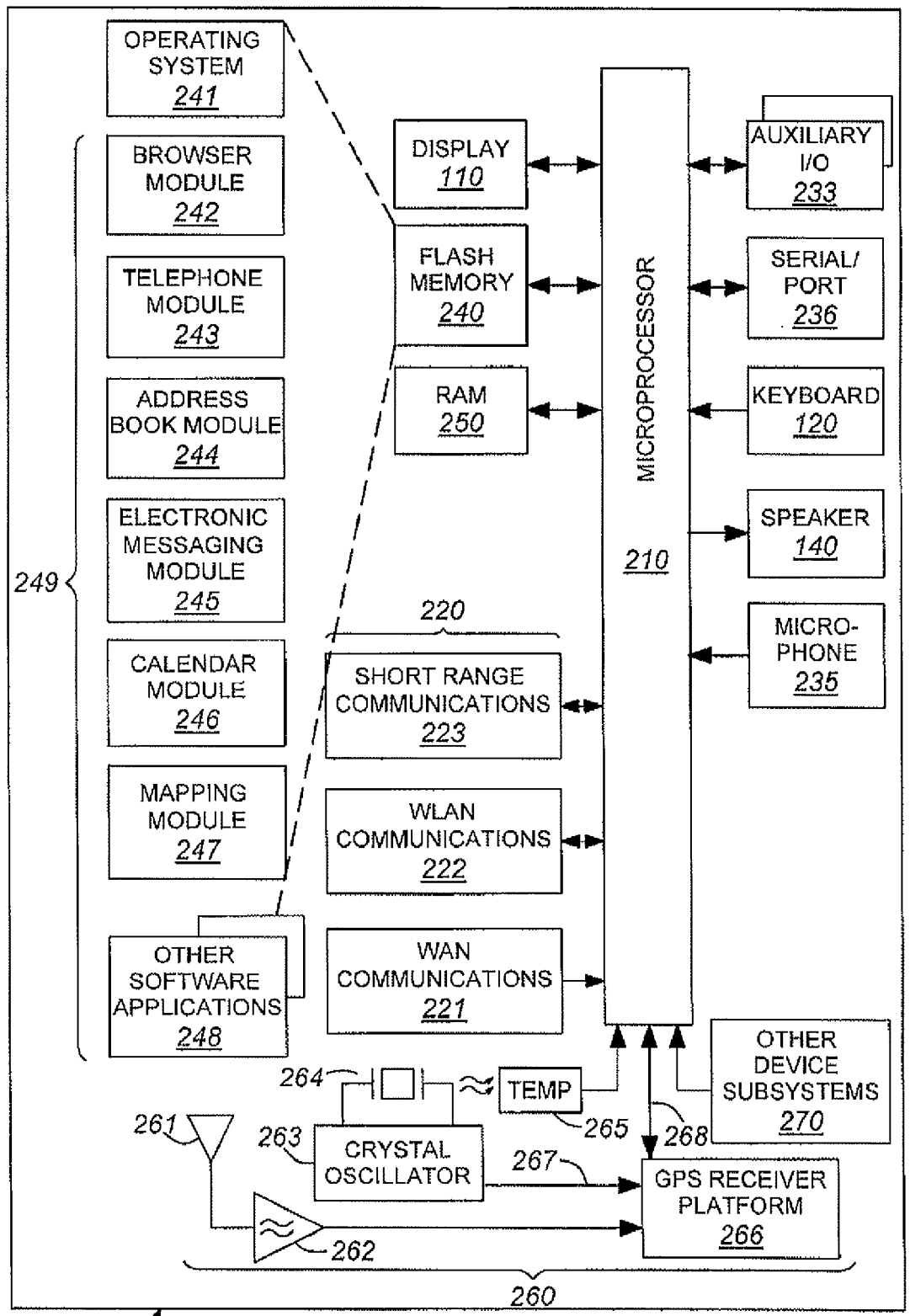
FIG. 2 is a simplified block diagram of the example device of FIG. 1.

Referring now to FIG. 2, the communications device 100 includes a controller that includes at least one microprocessor 210 for controlling the overall operation of the device 100. The microprocessor 210 interacts with a communications subsystem shown generally at 220 and with further device subsystems such as display 110, keyboard or keypad 120, one or more auxiliary input/output (I/O) subsystems or devices 233 (e.g. trackball 130, non-keyboard inputs 121-128 or a scrollwheel (not shown)), a speaker 140, a microphone 235, a serial port 236, a flash memory 240, random access memory (RAM) 250, a global positioning system (GPS) or navigation satellite receiver 260, and any other device subsystems generally designated as 270.

The microprocessor 210 operates under stored program control of the operating system software and/or firmware 241 and various software and/or firmware disclosures 249 used by the microprocessor 210, which are, in one example embodiment, stored in a persistent store such as flash memory 240 or similar storage element. Those skilled in the art will appreciate that the operating system 241, software disclosures shown generally at 249, or parts thereof, may be temporarily loaded into a volatile store such as RAM 250.

The microprocessor 210, in addition to its operating system functions, in example embodiments, enables execution of software applications 249 for interacting with the various device subsystems of the device 100. A predetermined set of software applications 249, which control basic device operations, including data and voice communication applications, such as a browser module 242, a telephone module 243, an address book module 244, an electronic messaging module 245 (which may include e-mail, SMS messaging and/or PIN messaging) and a calendar module 246, for example, will normally be installed on the communications device 100 during manufacture. Further software applications 249, such as a mapping module 247, may also be loaded onto the communications device 100 during manufacture, or through the communications subsystem 220, the auxiliary I/O subsystem 233, serial port 236, or any other suitable subsystem 270, and installed in the RAM 250 or a non-volatile store such as the flash memory 240 for execution by the microprocessor 210. Such flexibility in application installation increases the functionality of the device 100 and may provide enhanced on-device functions, communication-related functions, or both. In some embodiments, some or part of the functionality of the functional modules can be implemented through firmware or hardware components instead of, or in combination with, computer software instructions executed by the microprocessor 210 (or other processors).

Under instructions from various software applications 249 resident on the communications device 100, the microprocessor 210 is configured to implement various functional components or modules, for interacting with the various devices subsystems of the device 100.

The web browser module 242 permits access to a specified web address, for example via data transfer over one or more of the communications subsystem 220 components.

The telephone module 243 enables the communications device 100 to transmit and receive voice and/or data over one or more of the communications subsystem 220 components.

The address book module 244 enables address book information, such as telephone numbers, email and/or instant text messaging addresses and/or PIN numbers to be stored and accessed on the communications device 100.

The electronic messaging module 245 enables the communications device 100 to send and receive electronic messages over one or more of the communications subsystems 220 components. Examples of electronic messaging include email, personal identification number (PIN) messaging and/or short message service (SMS) messaging.

The calendar module 246 enables appointment and/or task information to be stored and accessed on the communications device 100.

The mapping module 247 provides location-based services relative to the current location of the device 100, including but not limited to storage, access and/or retrieval of detailed mapping information on the communications device 100 and provision of turn-by-turn directions from an initial map position to a desired destination map position in accordance therewith. Other location-based service modules (not shown) may include the E911 cellular phone positioning initiative of the Federal Communications Commission (FCC).

Referring briefly to FIG. 1 again, there is shown an example of handheld communications device 100 on which a plurality of user selectable icons are shown on its display screen 110. The icons are each associated with functions that can be performed by the communications device 100. For example, FIG. 1 shows a browser icon 152 for accessing web browsing functions (associated with browser module 242), a "Phone" icon 153 for accessing phone functionality (associated with telephone module 243), an "Address Book" icon 154 for accessing address book functions (associated with address book module 242), a "Messages" icon 155 for accessing electronic messaging functions of the communications device 100 (associated with electronic messaging module 245), a "Calendar" icon 156 for accessing calendar functions (associated with calendar module 246), a "Maps" icon 157 for accessing mapping functions (associated with mapping module 247), and an options icon 159 (associated with an options module, which may be a separate module or executed by one or more existing modules). An icon 150 is shown highlighted or focused by a caret or selection symbol 160 which can be navigated by a device user among the displayed icons through manipulation of the trackball 130 (or other navigational input device). The trackball 130 is also depressible, such that depression of the trackball 130 when an icon is highlighted or focused by selection symbol 160 results in the launch of functions of the associated module.

Each of the software disclosures 249 may include layout information defining the placement of particular fields, such as text fields, input fields, etc., in a user interface for the software disclosure 249.

Figure 3:
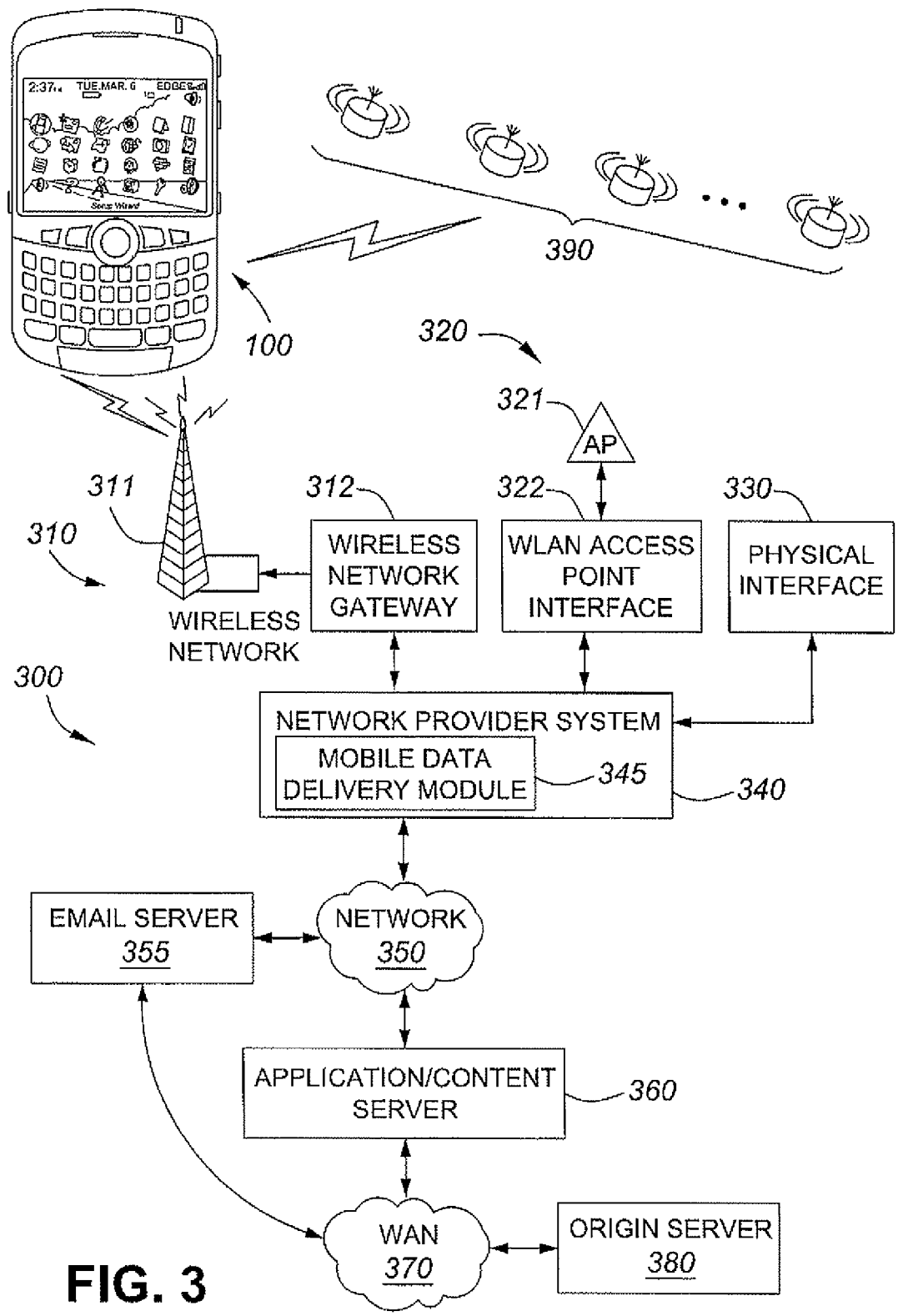
FIG. 3 is a simplified block diagram of a communications environment suitable for the example device of FIG. 1.

In FIG. 2, the communications subsystem 220 acts as an interface between the communications device 100 and a communications environment 300 shown in FIG. 3. As will be apparent to those skilled in the field of communications, the particular configuration of the communications subsystem 220 will be dependent upon the communications network(s) in the communications environment 300 in which the communications device 100 is intended to operate.

In FIG. 3, the communications environment 300 is shown to include one or more mobile electronic devices 100 (only one of which is shown in FIG. 3), a wireless Wide Area Network (WAN) 310 and associated base station 311, a Wireless Local Area Network (WLAN) 320, and/or other interfaces. In some example embodiments, the communications device 100 is configured to communicate in both data and voice modes over both wireless WAN and WLAN networks and to roam between such networks.

Thus, in the example embodiment shown in FIG. 2, the communications subsystem 220 includes a WAN communications module 221, a WLAN communications module 222 and a short range communications module 223.

The wireless WAN communications module 221 is for two-way communications with the wireless WAN 310 and the WLAN communications module 222 is for two-way communications with the WLAN 320 along an access point 321 associated therewith. According to one embodiment, the WAN 221 and WLAN 222 communications modules include respective antennas (not shown), RF transceivers (not shown), and some signal processing capabilities, implemented, for example, by a digital signal processor (not shown).

The short-range communications subsystem 223 may provide for communication between the communications device 100 and different systems or devices, which need not necessarily be similar devices. For example, the short-range communications module 223 may include an infrared device and associated circuits and components and/or a Bluetooth™ communications module to provide for communication with similarly enabled systems and devices.

In a data communications mode, a received signal such as a text message or web page download will be processed by the communications subsystem 220 and output to the microprocessor 210, which further processes the received signal for output to the display 110, or alternatively to an auxiliary I/O device 233.

The keyboard 120 and other various input devices, including, an auxiliary I/O device 233 (such as the buttons 121-128 and the trackball 130) and/or the microphone 235 on the communications device 100 may also be used to compose data items within the software applications 249, such as email messages or voice communications, in conjunction with the display 110, possibly an auxiliary I/O device 233 and/or the speaker 140. Such composed items and/or voice communications may then be transmitted and received over a communications network in the communications environment 300 through the communications subsystem 220.

The serial port 236 comprises a USB-type interface port for interfacing or synchronizing with another device, such as a desktop computer (not shown). The serial port 236 is used to set preferences through an external device or software application. The serial port 236 may also be used to extend the capabilities of the communications device 100 by providing for information or software downloads, including user interface information, to the communications device 100.

The flash memory 240 or other persistent storage of the communications device 100 may house, in addition to software and/or firmware stored program instructions, certain information including address book information such as telephone numbers, email and/or instant text messaging addresses and PIN numbers. Such information may also be at least partially stored at least some of the time in memory of a Subscriber Identity Module (SIM) card (not shown) used with the communications device 100, in volatile device memory (such as the RAM 250), and/or at a location accessible to the communications device 100 over WAN 310.

Additionally, the flash memory 240 may be used to store data structures, preferences and/or parameters, including upper and/or lower bounds of crystal oscillator frequency estimates at various temperatures in the GPS receiver subsystem 260.

The RAM 250, which may constitute non-volatile or volatile memory, with or without battery backup, may be used as a supplement to, or in place of, flash memory 240, and to maintain data and/or program instructions for use by the microprocessor 210 in executing one or more of the functions of operating system 241 and/or the software applications 249, including but not limited to the mapping module 247.

The navigation satellite receiver 260 may comprise an antenna 261, an amplifier 262, a crystal oscillator 263, a crystal 264, a temperature sensor 265 and a GPS or navigation platform or module 266. Those having ordinary skill in this art will readily appreciate that while the American Global Positioning System (GPS) is referenced in some instances throughout, methods and apparatus described in this disclosure may equally be used in conjunction with other types of global or regional navigation satellite systems, including but not limited to the European Galileo, Russian GLONASS and Chinese Beidou Compass systems.

The antenna 261 is a passive receive-only antenna and is connected to the amplifier 262. The amplifier 262, which may be a low noise amplifier (LNA), is connected to the antenna 261 and to the navigation platform 266. It amplifies high-frequency low power signals received from the GPS satellites 390 as discussed below and forwards them to the navigation platform 266. Filters (not shown) may also be inserted in the receive signal path to suppress out of band interferences, such as between the antenna 261 and the amplifier 262, and/or between the amplifier 262 and the navigation platform 266.

The crystal oscillator 263 is connected to the crystal 264, which may preferably be a quartz crystal, and to the navigation platform 266. It makes use of high-Q resonance of the piezoelectric effect from the crystal 264 and generates a periodic input clock signal 267 for use by the navigation platform 266. Typically, the input clock signal 267 is free-running and around a specific nominal frequency. However, due to factors such as temperature, voltage, loading, aging and manufacturing variations, the actual frequency is not typically exactly equal to the nominal frequency. In an example embodiment, the input clock signal 267 is generated at a nominal frequency of 16.369 MHz, however other nominal frequencies could be utilized.

As is typical with such structures, the crystal 264 will have a frequency drift error that varies roughly as a function of temperature. A typical uncompensated crystal 264 and oscillator 263 set may exhibit considerable operating frequency error, exhibited by drift of ±50 parts per million (ppm), with rates of change as a function of temperature of up to about 0.03 ppm per $°C.^2$.

Typically, a crystal oscillator signal 267 exhibits a hysteresis effect, which varies depending on temperature and its history, such as the rate of change of temperature, whether temperature is rising or falling, and in what range the temperature is changing. This is discussed in Raymond L. Filler, "Measurement and Analysis of Thermal Hysteresis in Resonators and TXCO's" ($42^{nd}$ Annual Frequency Control Symposium, 1998).

The crystal 264 and oscillator 263 may in some example embodiments be a temperature compensated crystal oscillator (TCXO) module in which compensation components (not shown) have been added to enhance the temperature stability of the basic oscillator to improve performance. Nevertheless, while reduced, a TCXO will also exhibit some frequency drift as a function of temperature as well as hysteresis effects.

The temperature sensor 265, which is connected to the microprocessor 210, may be a hand-trimmed compensation thermistor that is converted to a digital reading by an analog to digital converter (not shown). In an example embodiment, a 10 digit digital value may be derived from the temperature sensor reading. Preferably, it is hardware optimized such that the expected temperature range (for example, −20° C. to +80° C.) spans the entire range of the analog to digital converter. Alternatively, the temperature sensor 265 may be a digital temperature sensor, such as the 12-bit model TMP102 sensor manufactured by Texas Instruments.

The temperature sensor 265 is physically positioned in close proximity to the crystal 264 and oscillator 263 and preferably on a common thermal contour line relative to major heat sources on the underlying circuit board, such as power amplifiers. For even better thermal coupling, the temperature sensor may advantageously be installed inside the module that houses the quartz crystal 264.

The microprocessor 210 periodically samples the temperature reported by the temperature sensor 265. Advantageously, the sampling rate corresponds to and is preferably closely in phase with a report period of a message containing frequency information reported from the navigation platform 266. Such frequency information may include a frequency offset or correction factor applied by the navigation platform 266 to re-achieve the accurate frequencies used internally in the navigation platform 266, with or without an uncertainty associated with the reported offset.

The navigation platform 266 is a conventional GPS or A-GPS receiver platform, such as the GSC3 LTi GPS chip manufactured by SiRF Technology, Inc. Preferably, the navigation platform 266 has a bi-directional communications link 268 with the microprocessor 210 to permit the exchange of data and control messages in compliance with the Assisted GPS (A-GPS) enhanced performance system. A-GPS permits the navigation satellite receiver 260 to make use of an assistance server (not shown) to reduce the time required by the receiver to lock-on to an initial positional fix, or Time To First Fix (TTFF), which may be considerable in poor signal conditions, such as in a high multipath environment occasioned by tall buildings, being indoors or under trees.

One example of A-GPS may be related to the advent of the FCC's E911 mandate requiring the position of a cell phone to be available to emergency call dispatchers. Under an A-GPS system, a GPS subsystem embedded in or coupled to a cellular phone may benefit from aiding information provided to it by the wireless network. Such information may range from an approximate location based on identification of with which cell site the phone is connected, the time of day, and/or provision of GPS satellite navigation data, which may be used in the GPS receivers to derive orbital data on the position of the GPS satellites 390, or used to enhance processing gain for improved sensitivity. Additionally, an assistance server may provide information on ionospheric conditions and other errors affecting the GPS signal.

The Communications Environment

Turning now to FIG. 3, the WAN 310 may be implemented as a packet-based cellular network that includes a number of base stations 311 (only one of which is shown), where each of the base stations 311 provides wireless Radio Frequency (RF) coverage to a corresponding area or cell. The wireless WAN 310 is typically operated by a cellular network service provider that sells subscription packages to users of mobile electronic devices. The WAN 310 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), IDEN (Integrated Digital Enhanced Network) or various other third generation networks such as EDGE (Enhanced Data rates for GSM Evolution) or UMTS (Universal Mobile Telecommunications Systems).

The communications environment 300 also includes a wireless network gateway 312 and one or more network provider systems 340. The wireless network gateway 312 provides translation and routing services between the network provider system(s) 340 and the WAN 310, which facilitates communication between the mobile electronic devices 100 and other devices (not shown) connected, directly or indirectly, to the network provider system 340. The WAN 310 may also include location-based service services (not shown) to provide applications and/or GPS assistance.

The WLAN 320 comprises a network which, in some example embodiments, conforms to IEEE 802.11 standards such as 802.11b and/or 802.11g; however, other communications protocols may also be used for the WLAN 320. The WLAN 320 includes one or more wireless RF Access Points (AP) 321 (one of which is shown), that collectively provide a WLAN coverage area. The WLAN 320 may be operated by an enterprise (for example, a business or university) and the access points 321 are connected to an access point (AP) interface 322. The AP interface 322 provides translation and routing services between the access points 321 and the network provider system 340 to facilitate communication between the mobile electronic devices 100 and other devices (not shown) connected directly or indirectly, to the network provider system 340. The AP interface 322 is implemented using a computer, for example, a server running a suitable computer program or software.

According to one embodiment, other interfaces may be implemented using a physical interface 330. The physical interface 330 may include an Ethernet, Universal Serial Bus (USB), Firewire and/or infrared (IR) connection implemented to exchange information between the network provider system 340 and the communications device 100 when physically connected therewith, The network provider system 340 comprises a server which is located behind a firewall (not shown). The network provider system 340 provides access for the communications device 100, through either the WAN 310, the WLAN 320, or one of the physical interfaces 330 to the devices connected, for example, through an enterprise network 350 (e.g. an intranet), to the network provider system 340, such as a network 350, an email server 355, one or more disclosure/content servers 360, a second WAN 370 and/or an origin server 380.

According to one embodiment, a mobile data delivery module 345 provides HTTP connectivity between the wireless WAN 310 and the WLAN 320 and the other physical connections 330 and devices and/or networks connected directly or indirectly to the network provider system 340. In one embodiment, the mobile data delivery module 345 is implemented on a computer, such as one housing the network provider system 340. The network 350, the email server 355, the disclosure/content server 360, the second WAN 370 and the origin server 380 are individually and/or collectively in various combinations, a content source for the network provider system 340. It will be appreciated that the system shown in FIG. 3 comprises one possible communications network or configuration for use with the mobile communication device 100.

The network 350 may comprise a local area network, an intranet, the Internet, a direct connection, or combinations thereof. According to one embodiment, the network 350 comprises an intranet for a corporation or other type of organization.

In one example configuration, the email server 355 is connected to the network 350. This server 355 is configured to direct or redirect email messages received over the second WAN 370 and internally within the enterprise network 350 to be addressed to the mobile electronic device 100.

The disclosure/content server 360 may be connected to the network 350 and also to another network, for example, the second WAN 370.

The second WAN 370 may further connect to other networks. In one embodiment, the second WAN 370 comprises or is configured with the Internet, a direct connection, a LAN, a wireless communication link, or any combination thereof.

Content providers, such as the origin server 380, or Web servers, may be connected to the second WAN 370.

The Global Positioning System (GPS)

The communications environment 300 may also include a network of Global Positioning System (GPS) satellites 390. The concept of the Global Positioning System was originally proposed as a worldwide means of navigation for the US military. It originally consisted of a series of 24 satellites 390 in orbit at an altitude of about 20,200 kilometers above the earth's surface. As of September 2007, there are 31 actively broadcasting satellites in the GPS constellation. The additional satellites improve the precision of the navigation satellite receiver 260 calculations by providing redundant measurements.

This high orbit, which lies well above the earth's atmosphere, yields a very precise and stable orbit that may be very accurately measured by a ground station. The orbit of each satellite is monitored twice daily by each of five monitoring stations.

The position of each satellite 390 is known at any given time, including minor adjustments for gravitational effects of other planetary bodies, such as the sun and moon. Typically, this information is stored in an almanac within each navigation satellite 260, subject to periodic adjustments through message signals transmitted by each of the satellites 390.

Each satellite 390 makes a complete orbit every 11 hours, 58 minutes, 2 seconds. The original constellation was spread out in six orbital planes. Thus, at any given point in time, from any point on earth, at least four or five satellites 390 may lie above the horizon and thus remain in view. With the increased number of satellites, the constellation was changed to a non-uniform arrangement shown to improve reliability and availability of the system upon a multiple satellite failure, relative to the former uniform system.

Each satellite 390 continuously transmits high-frequency, radio signals comprising a coded message that contain timing information and data about the satellite's orbit. One of the frequency channels, denoted L1, is typically used by GPS applications for the general public. Other channels, denoted L2, L3, L4 and L5, are also defined and used by specific applications such as the U.S. military's special receivers. Some of them may also be used by certain civilian applications. These signals (such as on L1) are received by antenna 261, amplified by amplifier 262 and forwarded to the GPS receiver platform 266.

Each signal consists of a coded pseudo-random timing signal generated using a common reference clock signal and a message signal that identifies the transmitting satellite 390 and from which its position may be precisely determined, in conjunction with the almanac.

Each GPS receiver, such as the navigation platform 266 implemented in the mobile device 100, makes use of the pseudo-random timing signal from typically at least four different satellites 390. The signals from each of these satellites 390 are fully and precisely synchronized with each other.

The delay between the signals received by the navigation platform 266 from the satellites 390 and the signal generated by it when synchronized thereto may be used to derive the exact distance between the corresponding satellite 390 and the receiver platform 266, by multiplying the delay by the speed of light.

Thus, with each received signal, the position of the navigation satellite receiver 260 is constrained to lie on the surface of an imaginary sphere having a diameter equal to the distance between the navigation satellite receiver 260 and the transmitting satellite 390 and centered about the known position of the transmitting satellite 390.

The position of the navigation satellite receiver 260 may thus be obtained by trilateration. With data from only three satellites 390, a geographic non-elevation two-dimensional fix may be obtained, while a three-dimensional fix including elevation may be obtained with data from a minimum of four satellites 390. The most accurate positional fix will be obtained from satellites 390 widely distributed across the sky.

In addition to a positional fix, accurate time of day and velocity information may be deduced from the signals transmitted by the satellites 390.

Optimal reception is obtained when the navigation satellite receiver 260 is situated outdoors and with good visibility to most of the sky. Significantly degraded performance may be obtained when the navigation satellite receiver 260 is situated indoors, in caves or in deep canyons where sky visibility may be severely restricted. Typically, clouds or bad weather do not degrade receiver performance.

Clearly, the performance and accuracy of the navigation satellite receiver 260 is dependent upon the accurate synchronization of the coded timing signals transmitted by each satellite 390. Precision, accuracy and synchronicity of the timing information as between the satellites 390 is maintained through the use of several atomic reference clocks in the satellite 390, which are used to generate and synchronize the reference clock signals used to encode the coded timing signals to a common reference clock frequency.

Typically, the navigation satellite receiver 260 contains a fixed, free-running clock oscillator circuit 263, making use of a quartz crystal 264 to determine its frequency.

With the use of atomic reference clocks, each of the signals transmitted by the GPS satellites 390 has an accurate transmit frequency. However, such is not necessarily the case when arriving at the antenna 261. Generally, the received signals will be shifted in frequency due to the Doppler effect. The velocity of movement of either or both of the satellites 390 and the navigation satellite receiver 260 may contribute to the Doppler frequency shift.

The problem of properly receiving the transmitted satellite signals is exacerbated by any discrepancy between the actual frequency of the navigation satellite receiver 260 input clock signal 267 and its nominal value. Such discrepancy contributes to an apparent frequency shift of the incoming GPS signals seen by the navigation satellite receiver 260.

Absent the provision of any aiding information initially, the amount of Doppler shift may not be accurately known and any apparent frequency shift will not be known. Accordingly, the navigation satellite receiver 260 typically searches for the satellite signals over a range of frequency hypotheses that may be defined by a frequency search window. In addition, although not strictly relevant to the present disclosure, the navigation satellite receiver 260 also searches over a range of propagation delay hypotheses that may be defined by a time search window. Conventionally, the frequency search window and the time search window are treated as a single two-dimensional search window.

The dimensions of the search window have a significant impact on the performance of the navigation receiver 260. If the search window is set too narrow, there is a risk that the incoming signal frequency lies outside it. If so the search will fail unless the search window is expanded. If the search window is set too wide, it will take more time on average to find the signal, which, unnecessarily increases the Time To First Fix.

The navigation satellite receiver 260 may be thought of operating in one of two modes. The first, or acquisition, mode extends from power up, reset or loss of positional lock, until a first fix has been obtained. The second, or operational, navigational or tracking, mode extends from the Time To First Fix until positional lock has been lost, such as through reset or power down or adverse conditions.

Thus, upon startup, the navigation satellite receiver 260 enters the acquisition mode, establishes an initial search window and looks for satellite signals within the search window over time and frequency. If sufficient satellite signals cannot be identified within the search window, the search fails unless the search window is expanded.

Thus, it is preferable to establish a search window that is as narrow as possible to ensure receipt of sufficient satellite signals to achieve signal lock and enter the operational mode. This would minimize the time spent in the acquisition mode and correspondingly, the average Time To First Fix. Once it has received timing signals from typically 4 satellites 390, the navigation satellite receiver 260 is able to calculate a position fix and additionally, quantify any discrepancy between the actual and nominal frequency of the input clock signal 267 generated by the clock oscillator circuit 263 and the crystal 264, by assuming that the distance measurements to each satellite 390 are accurate and the satellite orbit information is known.

If the actual frequency of the input clock signal 267 generated by the clock oscillator 263 and the crystal 264 were capable of being accurately estimated and provided to the navigation satellite receiver 260, such frequency aiding could be employed to permit the navigation satellite receiver 260 to reduce the time spent in acquisition mode. Preferably, if an estimate of any Doppler shift of the satellites may be obtained in a manner known to those having ordinary skill in this art (being beyond the scope of the present invention), this would further improve the quality of the initial search window.

A number of techniques are known for estimating or measuring and compensating for oscillator signal frequency variation due to temperature. In U.S. Pat. No. 5,654,718, issued Aug. 5, 1997, Beason et al. disclose a device and method for calculating and storing the frequency offset of a crystal oscillator signal over a range of temperatures during the operation of a GPS receiver. The frequency offset is then used when the receiver is in the acquisition mode to improve or compensate for the frequency of the oscillator signal.

In U.S. Pat. No. 6,509,870, issued Jan. 21, 2003, Matsushita et al. disclose a GPS receiver in which the temperature of the local oscillator crystal is measured and recorded in association with frequency, wherein the data is used to create a ninth order polynomial representing frequency drift error versus temperature.

In U.S. Pat. No. 6,630,872, issued Oct. 7, 2003, Lanoue et al. disclose a method for generating a thermal model of a digital compensation crystal oscillator (DCXO), estimating the temperature of the oscillator based on the thermal model and providing an output signal representing the oscillator signal frequency based on the measured temperature.

In U.S. Pat. No. 7,148,761, issued Dec. 12, 2006, Shieh discloses a GPS receiver in which a plurality of lower-order polynomial equations are used to represent frequency drift errors over discrete temperature ranges.

These known techniques involve complex mathematical modelling, all of which rely on the simplified and generally inaccurate assumption that the frequency drift error of the oscillator has a single value at a given temperature.

Thus, the above techniques do not address the fact that the oscillator signal performance as a function of temperature is complex and also may depend, at least in part, on whether the temperature is in a rising or falling trend.

For many applications, the navigation satellite receiver 260 spends the majority of time in operational mode, during which the actual frequency of the clock signal that corresponds with that of the satellites 390 is known. Frequency data about the input clock signal 267 provided by the crystal 264 and oscillator 263 may therefore be accurately obtained and stored, by which more accurate frequency information (e.g. frequency offset and possibly uncertainty) may be provided to the navigation platform 266 during subsequent acquisition attempts.

This frequency information is maintained in one or more compensation tables, which may be maintained in flash memory 240 or other non-volatile data storage.

In an example embodiment, a pair of compensation tables R and F are maintained, corresponding to empirical values obtained during previous instances of the operational mode. In recognition of the hysteresis effect of frequency as a function of temperature, the compensation tables correspond to a rising and to a falling temperature trend. The purpose of each table is to specify the widest possible frequency uncertainty range for a given temperature index value and a temperature trend known to the navigation satellite 260 due to the hysteresis effect.

Accordingly, when a measured frequency offset value is found to lie outside the then extant hysteresis loop, signifying a new outer boundary of the loop, the appropriate table is updated quickly. On the other hand, when the measured frequency offset value is found to lie within the then extant hysteresis loop, the table need not be updated at all, or optionally, in order to incorporate gradual changes to the temperature response of the navigation satellite receiver 260 due to aging and other long-term effects, at least updated more slowly.

In an alternative embodiment, the pair of compensation tables may be maintained corresponding to upper and lower bounds of frequency offset respectively, in recognition of the hysteresis effect of frequency as a function of temperature. If, during the operational mode, a measured frequency offset value is found to be higher than the then extant upper bound at a given temperature index, the corresponding upper bound table entry is replaced by the newly found upper bound value. If a measured frequency offset value is found to be lower than the then extant lower bound at a given temperature index, the corresponding lower bound table entry is replaced by the newly found lower bound value; and if a measured frequency offset value is found to be between the upper and lower bounds for the temperature, the table values are left undisturbed.

In either scenario, each compensation table may consist of a two column table of data entries, one corresponding to an index temperature value and the other corresponding to a corresponding frequency offset value. Alternatively, the temperature may be implicitly represented by the index of the table elements of a single column table, where the column stores frequency offset information. In the further alternative, the navigation platform 266 may not only report frequency offset but also the estimated measurement uncertainty during the operational mode, in which case an additional column may be added in each table to store this information.

Preferably, the compensation tables may be sized to contain a series of index temperature values that span over the useful portion of the digital operational temperature range of the temperature sensor 265, and to a sufficient precision, for example, 128 entries long, with each entry constituting a 7-bit temperature reading. The word length of the entries may also be sufficient, for example, a signed 16 bit word in this example embodiment, to hold frequency offset values in Hz, which may be, for example referenced at the GPS L1 frequency. In such a situation, a 16 bit value is able to represent up to ±20 ppm of frequency offset.

While in some example embodiments, the index temperature values are evenly spread across the digital operational temperature range, those having ordinary skill in this art will appreciate that if the temperature sensor 265 has a non-linear voltage relation to the temperature values, the index temperature values may not evenly span over this temperature range.

Preferably, the frequency offset values are initialized to an unlikely value such as $-2^{15}=-32768$, which will represent a blank or untrained temperature value.

Operation

Figure 4:
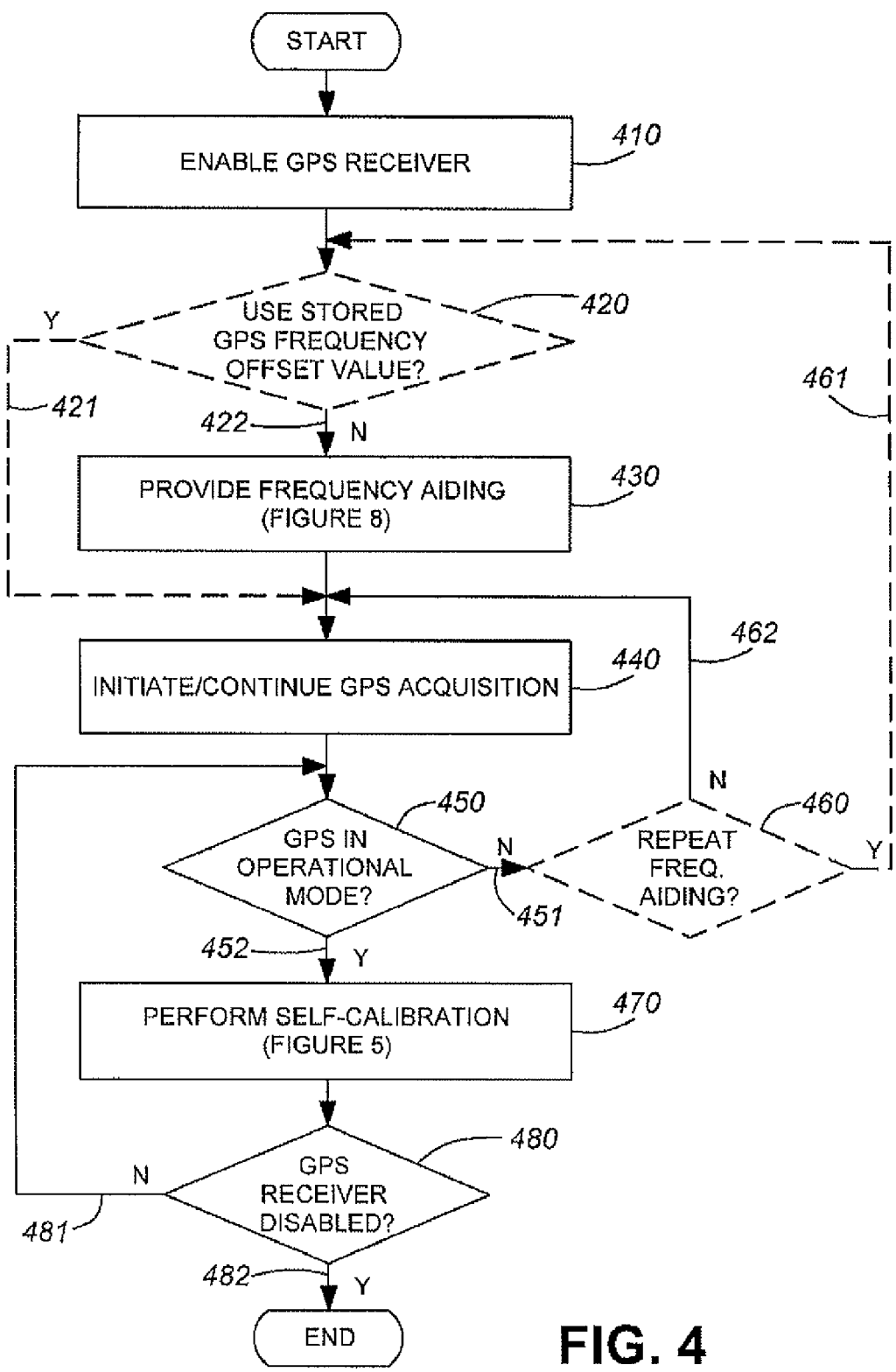
FIG. 4 is a flowchart of operation of the GPS receiver in the example device of FIG. 1.

As illustrated in FIG. 4, which shows example processing steps for the navigation satellite receiver 260, when the navigation satellite receiver 260 is reset or powered on, it is enabled 410 and attempts to acquire the GPS signal, as described above. Because the navigation satellite receiver 260 does not know the exact frequency of the local oscillator 263 input clock signal 267, the navigation satellite receiver 260 searches for the signal within a defined frequency window. If the search window is too narrow, due to the value of the oscillator frequency offset, the GPS signal will fall outside the window and the navigation satellite receiver 260 will not find the signal. If the window is too wide, it would take longer on average to find the signal. Therefore, it is advantageous to determine the narrowest possible search window that will guarantee that the GPS signal is bracketed in frequency.

Optionally, the navigation satellite receiver 260 first determines 420 (shown in dashed outline to indicate an optional step) if it is able to rely on a fresh frequency offset value stored during its recent operation, in order to narrow the uncertainty in the size of its initial search window. The stored frequency offset value corresponds to a TCXO offset value estimated during the previous GPS operation. Usually, in a "hot restart" of the navigation satellite receiver 260, such stored information is available and fresh, and it is assumed that there is little concern that the ambient temperature of the oscillator 263 has significantly changed. The determination whether a stored frequency offset is "fresh" can be based on the time since the last GPS operation in operational mode. It may also be further, or in the alternative, based on the temperature change since the last GPS operation.

If so 421, it proceeds to step 440. If not 422, for example, because it is proceeding from a warm start or cold start, it proceeds to make use of frequency aiding 430, as described below and shown in FIG. 8.

If step 420 is not followed, the navigation satellite receiver 260 proceeds directly to the step of providing frequency aiding 430. In either event, once frequency aiding has been provided 430, it initiates GPS acquisition 440 using an initial estimate obtained in the frequency aiding step 430.

At periodic intervals, a determination is made as to whether the navigation satellite receiver 260 has successfully entered operational mode 450 and remains in such mode. If not 451, it may optionally determine 460 (shown in dashed outline to indicate an optional step) whether additional frequency aiding is appropriate, for example, when there has been a precipitous change in the ambient or circuit board temperature, the device 100 has been moved into a different area with different temperature, or the on-board radio is turned on or turned off. If so 461, it proceeds to step 420. If not 462, it proceeds to step 440.

If step 460 is not followed, it proceeds directly to step 440 to continue the acquisition of GPS signals.

If the navigation satellite receiver 260 is in the operational mode 452, it performs self-calibration 470 (also known as training, learning or self-learning; an "untrained" value as described herein refers to a value that has not yet been self-calibrated at a given point of temperature), to determine the frequency variation in the oscillator signal as a function of temperature, as disclosed below and shown in FIG. 5. After the self-calibration is complete, resulting in a further update of the compensation tables, a determination is made as to whether the navigation satellite receiver 260 is instructed to be disabled 480. If not 481, it once again checks whether the navigation satellite receiver 260 is in operational mode. If so 482, the processing terminates until the navigation satellite receiver 260 is re-enabled.

Operational Mode

Figure 5:
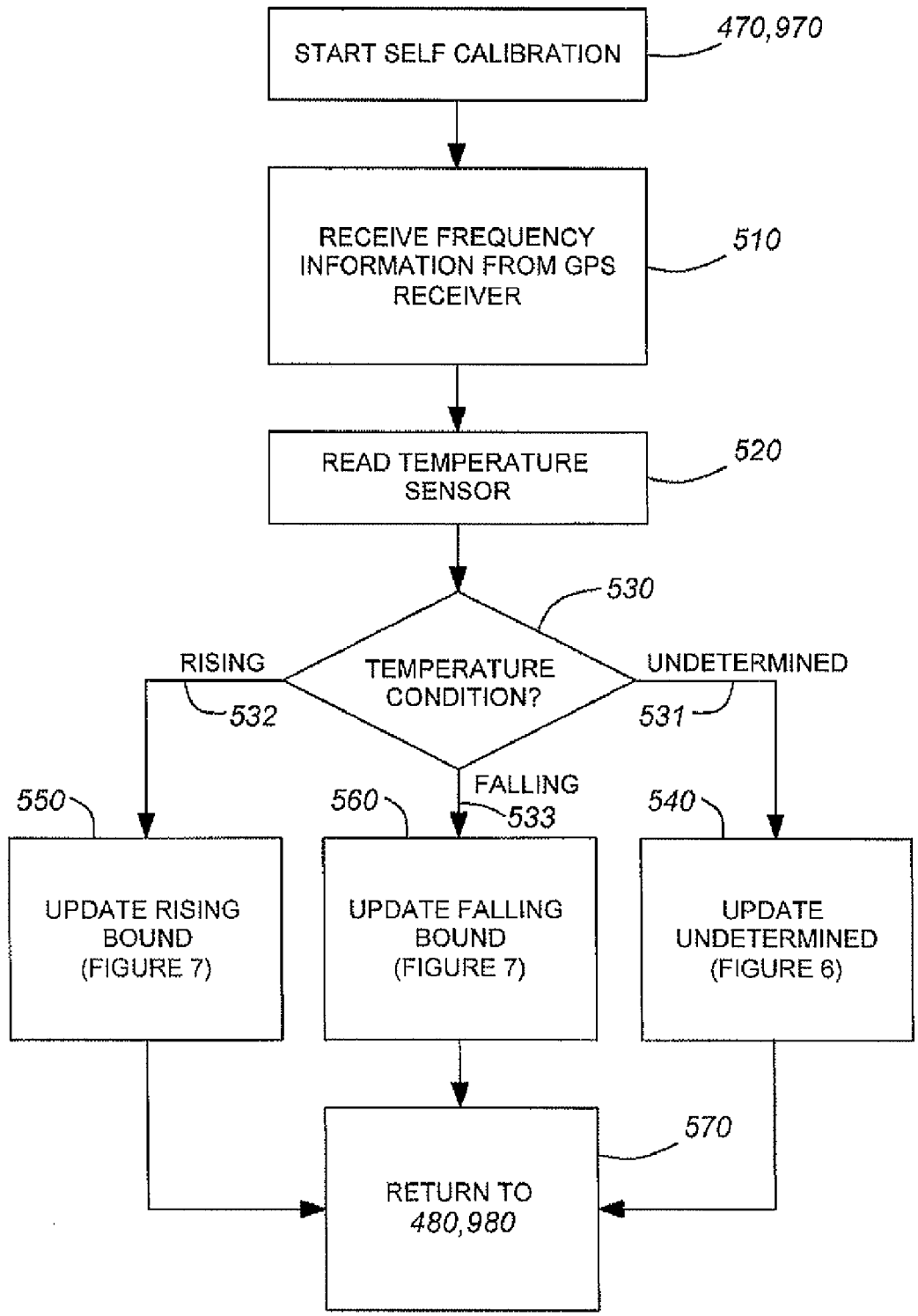
FIG. 5 is a flowchart of the self-calibration process for determining oscillator signal variation due to temperature referenced in FIG. 4.

Turning now to FIG. 5, during the operational mode of the navigation satellite receiver 260, frequency data, which may include frequency offset, frequency and/or an uncertainty value associated with the returned frequency offset or frequency, is returned 510 by the navigation platform 266 to perform a self-calibration of the oscillator 263. The frequency data may be provided by the navigation platform 266 to the microprocessor 210 on a periodic basis, determined by the report period of the frequency offset, which in an example embodiment, may be 12 sec. The frequency data may be in absolute units such as Hz., or may be relative, such as parts per billion (ppb). Preferably, the frequency data is frequency offset data, but those having ordinary skill in this art will appreciate that any kind of frequency information may be substituted therefor.

Generally, the selection of the appropriate reporting and sampling period depends upon the thermal time constant of the circuit board within a device enclosure on which the navigation platform 266 and the crystal oscillator 263 reside, and the frequency of reporting of the navigation platform 266.

Concurrently, the microprocessor 210 reads 520 the digital temperature value of the temperature sensor 265. Although the steps of receiving frequency offset information and reading the temperature sensor are shown as sequential steps in FIG. 5, it will be appreciated by a person skilled in the art that these steps may conceivably occur effectively at the same time and/or in either order.

Preferably the temperature is scaled (with the application of rounding) so that the useful voltage range is re-mapped to the numerical range, which may be, in an example embodiment, [0, 127] suitable for direct comparison with the index temperature values in the compensation tables R and F. With the above-described thermistor/analog to digital converter example embodiment having a 10 bit A/D converter, this scaling may consist of a right shift of the 10 bit raw digital value by three bits.

Alternatively, when the temperature lies in a range of between [a,b] it may consist of subtracting an integer value A and then multiplying by a second value B in accordance with the relations:

$$A = a \quad (1)$$

$$B = \frac{M}{b-a} \quad (2)$$

where M is the table size, which may be, in an example embodiment, 127.

With the above-described TMP10x (e.g. TMP102) series digital sensor embodiment, this scaling may consist of either programming the device with a lower number of bits, or else a right shift of the 12 bit digital value by five bits. Those having ordinary skill in this art will readily appreciate that other scaling methods may also be suitable.

The microprocessor 210 uses this information to identify which, if any, of the two compensation tables to update, and how and with what value to update it, in accordance with pre-determined rules. Different update methods may apply depending on whether the temperature trend is known to be rising or falling or if the temperature trend cannot be determined.

In an example embodiment, a suitable set of rules may be as follows:

First, identify whether the measured temperature constitutes a rising trend, a falling trend or is undetermined 530. For example, the measured temperature value $T_i$ may be compared against the two immediately previous measurements and $T_{i-1}$ and $T_{i-2}$ in accordance with the following relations:

$$\text{If } (2 \times T_i) - (T_{i-1} + T_{i-2}) \geq T \text{ then there is a rising trend} \quad (3)$$

$$\text{If } (T_{i-1} + T_{i-2}) - (2 \times T_i) \geq T \text{ then there is a falling trend, and} \quad (4)$$

$$\text{If } |(2 \times T_i) - (T_{i-1} + T_{i-2})| \leq T \text{ then there is no discernable trend,} \quad (5)$$

where T is a threshold value, and in an example embodiment, T=2.

Figure 6:
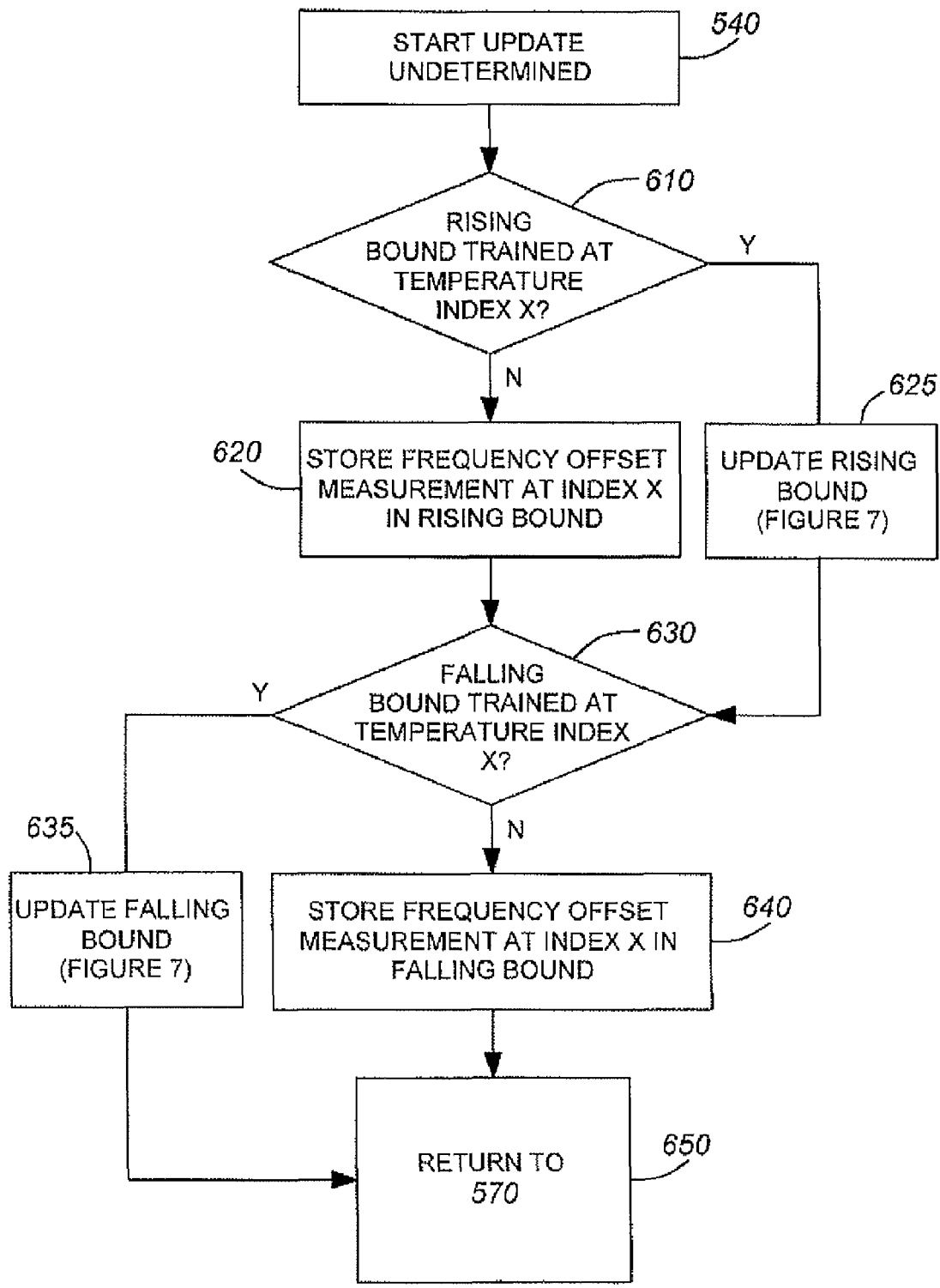
FIG. 6 is a flowchart of the update process when a temperature condition is undetermined, referenced in FIG. 5.

Second, if there is no discernable trend 531, then certain condition-specific processing 540 is performed. As shown in FIG. 6, this may constitute the frequency information corresponding to the measured temperature, in each of the compensation tables, being examined. If the frequency information in either or both of the compensation tables is untrained 610, 630 at the reported temperature, then the untrained frequency information in one or both tables 620, 640 is updated with the returned frequency offset value x, which in one example embodiment represents the absolute frequency error in Hz, as observed at the L1 GPS carrier frequency and in another example embodiment, may represent the relative frequency error in parts per billion (ppb). An untrained value would be represented by the presence of the unlikely value such as $-2^{15} = -32768$.

If the frequency information in either or both of the compensation tables is not an untrained value, then the non-initialized information is updated 625, 635, as discussed below, preferably by a slow update (also discussed below). In one example embodiment, the trained information is not updated at all, in which case steps 625 and 635 are bypassed.

Figure 7:
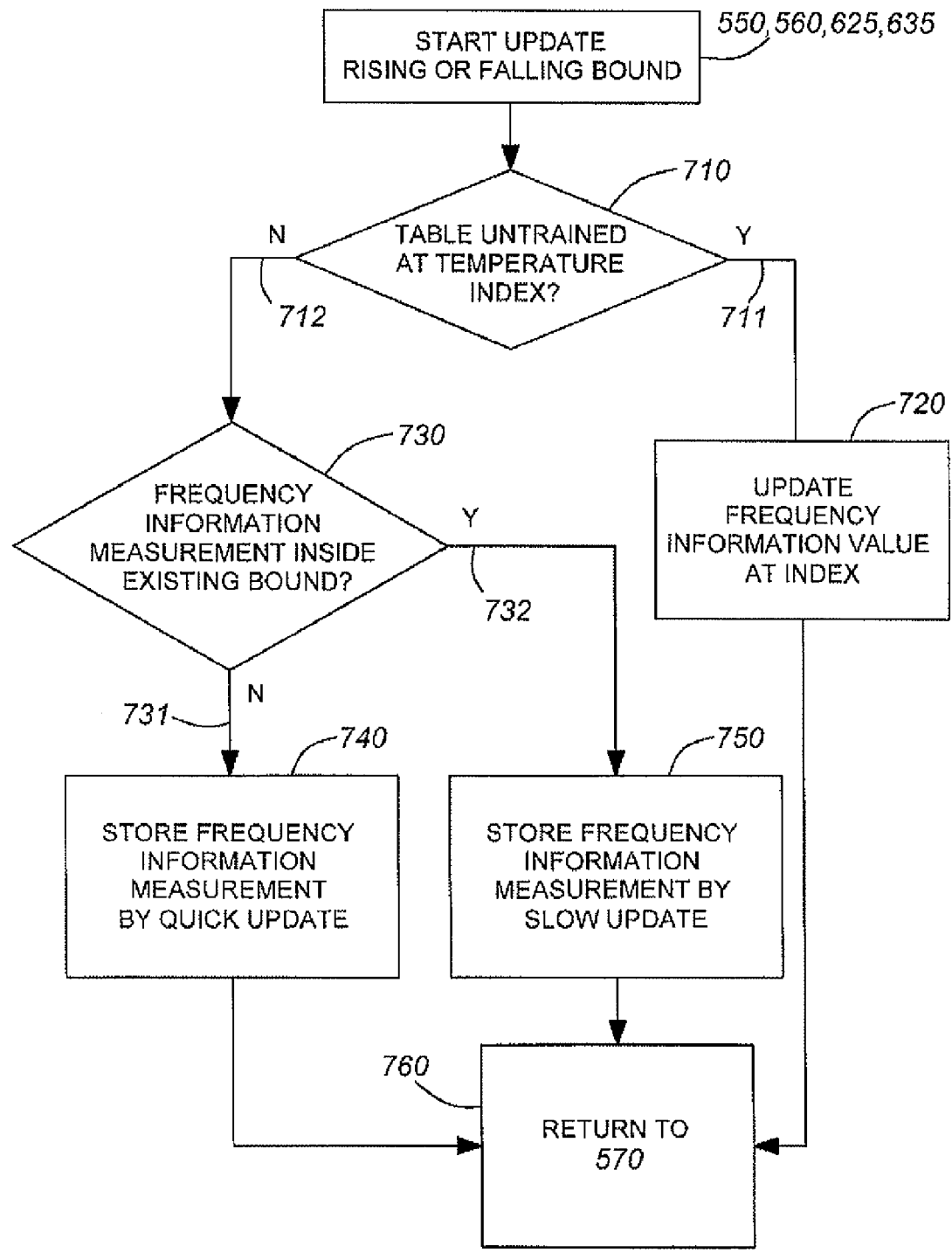
FIG. 7 is a flowchart of the update process for rising or falling temperature conditions referenced in FIG. 5.

Third, if there is a rising trend 532, then in R, certain condition-specific processing is performed. As shown in FIG. 7, the entry indexed by a temperature value closest to $T_i$ is accessed and a decision is made how to update the frequency information corresponding to the closest index value to the measured temperature and if so, by what. Similarly, if there is a falling trend 533, the identical condition-specific processing is performed, but on F. That is, the entry indexed by a temperature value closest to $T_i$ is accessed and a decision is made how to update the frequency information corresponding to the closest index value to the measured temperature.

In either case, the frequency information corresponding to the closest index value to the measured temperature in the appropriate table is examined 710. If it is an untrained value 711, represented by an unlikely value such as $-2^{15} = -32768$, the returned frequency data x is substituted therefor 720.

If, however, the frequency information corresponding to the closest index value to the measured temperature in the appropriate table is not an untrained value 712, the decision by what amount to update the frequency information may, in an example embodiment, depend on whether the returned frequency data lies outside or inside the then extant hysteresis loop 730 at the closest index value to the measured temperature.

As discussed above, when the frequency data lies outside the outer bounds denoted by the hysteresis loop 731, a quick update may be performed 740, so as to cause the hysteresis loop to rapidly converge to the new frequency data. On the other hand, when the frequency data lies within the outer bounds denoted by the hysteresis loop 732, a slow update may be performed 750, which will cause the hysteresis loop to gradually converge to the new frequency data, against the possibility that the new data is representative of a long-term trend, for example, as the navigation satellite receiver 260 ages.

Figure 10A:
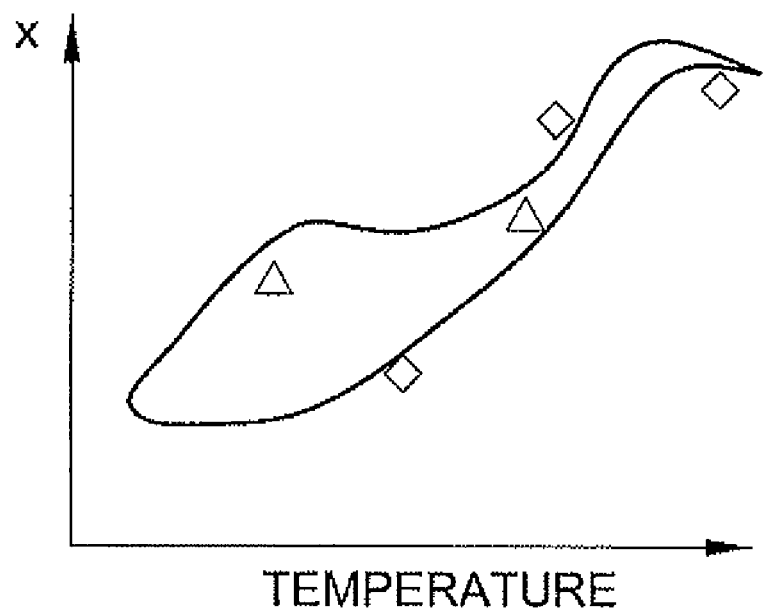
FIG. 10 is a graphical representation of example frequency drift characteristics with hysteresis effects as a function of temperature.

In a situation, such as is modeled in example fashion in FIG. 10(*a*), in which a triangle denotes a data point that lies "inside" the hysteresis loop, a diamond denotes a data point that lies "outside" the hysteresis loop and a circle denotes a data point that lies "on" the hysteresis loop, that is, it remains undetermined whether it lies "inside" or "outside" the hysteresis loop, the determination of whether the frequency data lies inside or outside the outer bounds is relatively straightforward, because the loop does not intersect or cross over itself.

Figure 10B:
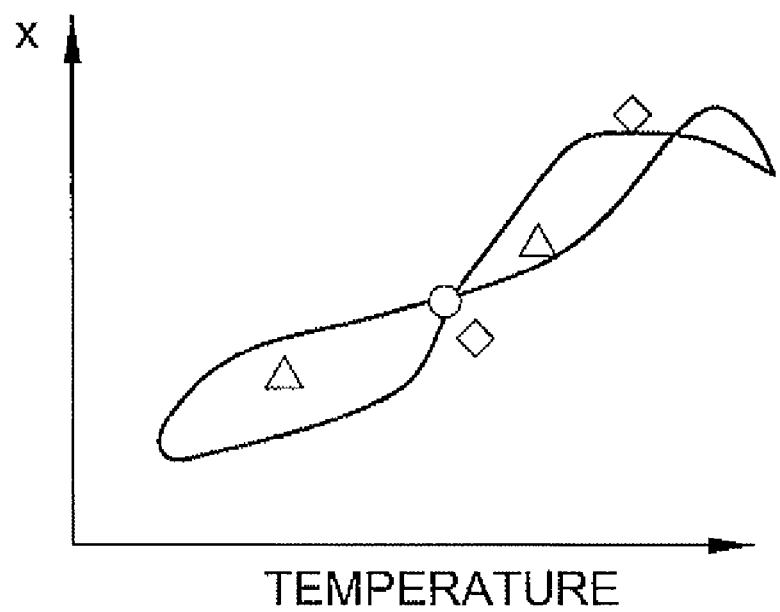

However, in a situation, such as is modeled in example fashion in FIG. 10(b), in which the hysteresis loop crosses over itself at a number of points, the determination of whether the frequency data lies outside or inside the hysteresis loop is more complicated.

In the example embodiment being described, the returned frequency data x is compared against the frequency information currently stored in each of the compensation tables R and F in accordance with the relations defined by Equations (6) and (7) below, corresponding respectively to a rising and falling temperature trend. The returned frequency data x is considered to lie "outside" the hysteresis loop if the relation returns as logical false, and to lie "inside" the hysteresis loop if the relation returns as logical true:

$$\text{sign}(x-R[\text{index}])=\text{sign}(F[\text{index}]-R[\text{index}])? \qquad (6)$$

$$\text{sign}(x-F[\text{index}])=\text{sign}(R[\text{index}]-F[\text{index}])? \qquad (7)$$

If a quick update is thus called for, then the frequency information x' currently stored in the corresponding compensation table T, that is, R, in the case of a rising trend and F, in the case of a falling trend, is replaced by filtered frequency information x" calculated in accordance with the following example relation:

$$x''=x'+(x-x')>>2 \qquad (8)$$

where >>n represents an n-bit shift to the right, or to dividing by $2^n$.

On the other hand, if a slow update is called for, then the frequency information x' currently stored in the corresponding compensation table T, that is, R, in the case of a rising trend and F, in the case of a falling trend, is replaced by a filtered frequency information x" calculated in accordance with the following example relation:

$$x''=x'+(x-x')>>5 \qquad (9)$$

In this manner, during the tracking mode (or indeed during those periods of manufacturing production testing when the navigation satellite receiver 260 is tracking simulated GPS satellite signals), the compensation tables R and F are being populated and periodically updated to reflect the current understanding of the hysteresis behaviour of the crystal 264 and oscillator 263.

Those having ordinary skill in this art will appreciate that the number of right shifts in equations (8) and (9) determines the rate of convergence of the updates, with fewer bits corresponding to slower convergence speed. In an example embodiment, the number of shifts may be as many as 7 bits to the right.

Acquisition Mode

When, the navigation satellite receiver 260 is next put into acquisition mode, whether by a loss of lock to GPS signals, a system reset or a power on condition, the data stored in the compensation tables may be accessed to provide a better estimate of the frequency offset to be supplied to the navigation platform 266 in conjunction with the free-running fixed input clock signal 267.

Figure 8:
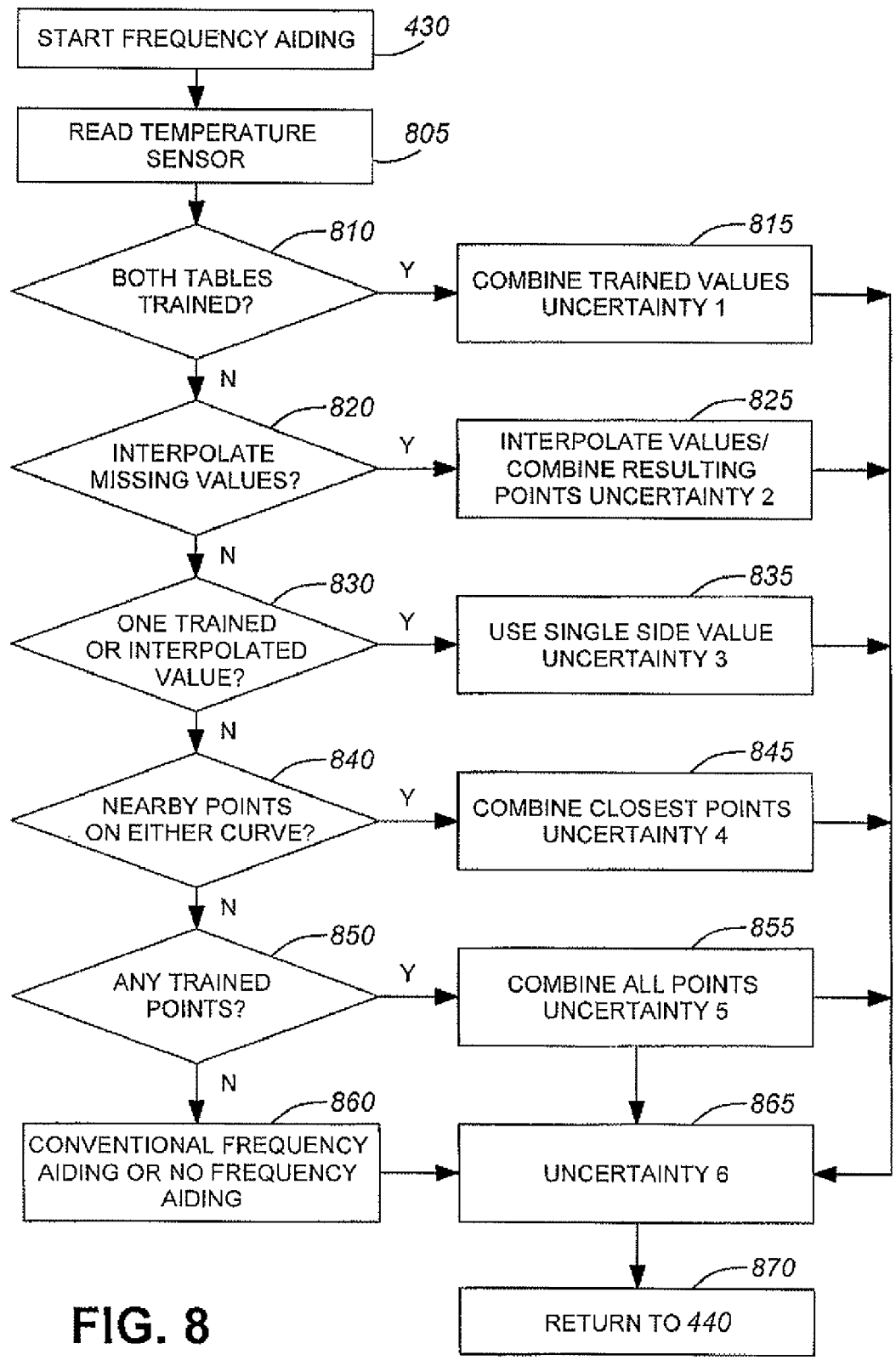
FIG. 8 is a flowchart of the frequency aiding process referenced in FIG. 4.

The manner in which this may be accomplished may be, in an example embodiment, as follows and as illustrated in FIG. 8:

First, the microprocessor 210 reads 805 and scales, if appropriate, the digital temperature value $T_i$ of the temperature sensor 265. Preferably it is scaled so that the useful voltage range is re-mapped to the numerical range [0, 127] suitable for direct comparison with the index temperature values in the compensation tables R and T.

Second, the microprocessor 210 accesses the frequency information x' stored in each of the compensation tables R and F (the "indexed entry") and indexed by a temperature value closest to $T_i$ (the "index").

If neither indexed entry has an unlikely value ("untrained value") 810 such as $-2^{15}=-32768$, that is, there is corresponding trained frequency information in each table corresponding to the index ("trained indexed value"), then a combined value of the two trained indexed values is calculated 815 and submitted in a message to the navigation platform 266. Additionally, the navigation platform 266 may be supplied with an uncertainty value, indicative of an "uncertainty 1" condition, such as, for example, 0.15 ppm, that is, since both indexed values are trained values, that the frequency offset is considered to be highly accurate and is therefore assigned a narrow uncertainty value.

The values, designated $x_R$ and $x_F$ correspond to the two tables F and R. In an uncertainty 1 scenario, they are both trained indexed values. In other scenarios, as discussed below, the values $x_R$ and $x_F$ may be interpolated from neighbouring entries depending on the availability of trained entries in the neighbouring range as will be discussed below. The values $x_R$ and $x_F$ may be combined in any of a number of different ways.

Typically, the values are combined to arrive at a combined value X using a weighting factor w lying in the range of [0,1] in accordance with the relation:

$$X=w*x_R+(1-w)*x_F \qquad (10)$$

In the simplest case, w is 0.5, signifying that the combination constitutes taking the mean of the two values. Alternatively, a higher weight could be assigned to the value emanating from the table that corresponds to the prevailing temperature trend, in order to give it preferential weighting. For example, if the temperature is rising, w could be set to 0.75, and if the temperature is falling, w could be set to 0.25. In an extreme case, w could be set to 1 or 0, to select the value corresponding to the prevailing temperature trend only. Those having ordinary skill in this art will readily appreciate that other combining methods and values could be adopted.

If, however, one or both of the indexed entries is the unlikely value, then for such untrained indexed entries, a subset of table entries (the "neighboring entries") in the compensation table before and after the indexed value are accessed. In an example embodiment, up to five additional values on either side of the indexed value may be accessed, corresponding to a temperature range of approximately 7.5° C. If a value other than the unlikely value is found among the neighboring entries on each side of the untrained indexed entry, then such values on each side of the untrained indexed entry (the "trained neighboring values") and closest to the current temperature index are interpolated in order to arrive at an interpolated value at the temperature index.

If each of the compensation tables returns either a trained indexed value or an interpolated value 820 corresponding to the index, then such values are combined 825 as discussed above and submitted to the navigation platform 266 in a message. Additionally, the navigation platform 266 may be supplied with an uncertainty value, indicative of an "uncertainty 2" condition, such as, for example, 0.20 ppm, that is, that at least one of the combined values is an interpolated value.

If only one of the compensation tables returns either a trained indexed value or an interpolated value 830 corresponding to the current temperature index, and the other table could not find a trained indexed value or trained neighboring value from among the neighboring entries on both sides to be used for interpolation, then the returned trained indexed value or interpolated value from the one table is submitted 835 to the navigation platform 266 in a message. Additionally, the navigation platform 266 may be supplied with an uncertainty value, indicative of an "uncertainty 3" condition, such as, for example, 0.25 ppm, that is, that an exact value or interpolated value could be obtained from one of the compensation tables but not from both tables.

If neither of the compensation tables is able to return either a trained indexed value or an interpolated value corresponding to the index from its neighboring entries, but at least one trained value exists among the neighboring entries considered in both tables, that is at least one trained value exists among the neighboring entries on one side of the untrained indexed entry but not on the other side in both of the tables 840, then the closest trained values for each table from among the neighboring entries are combined 845 and submitted to the navigation platform 266 in a message. If a trained value is found from among the neighboring entries in only one table, the closest trained value from among the neighboring entries is selected and submitted to the navigation platform 266 in a message. Additionally, in either case, the navigation platform 266 may be supplied with an uncertainty value, indicative of an "uncertainty 4" condition, such as, for example, 0.30 ppm in the former case and 0.35 ppm in the latter case, that is, that an exact value or interpolated value could not be obtained from either compensation table but that a trained value was found in at least one of the compensation tables from among the neighboring entries considered.

If no trained value exists among the neighboring entries considered in either table, but at least one trained value is found outside the neighboring range in one or both of the tables 850, then the mean value of all such trained values in both tables is calculated 855 and submitted to the navigation platform 266 in a message. Additionally, the navigation platform 266 may be supplied with an uncertainty value, such as, for example, 0.45 ppm, that is indicative of an "uncertainty 5" condition, namely that a trained value could not be obtained from among the neighboring entries considered from either compensation table but that at least one trained value was found in at least one of the compensation tables, but outside the neighboring range.

Finally, if no trained values may be found in either of the tables 860, then conventional methods of providing frequency aiding may be utilized 865.

For example, where, as in the example embodiments described in the Figures, the navigation satellite receiver 260 has a corresponding wireless communications subsystem such as WAN communications module 221, provided that the wireless network frequency is accurate (the Global System for Mobile Communications (GSM)/Universal Mobile Telecommunications System (UMTS) TS 05.10/TS 25.104 standards specify a permissible error of ±0.05 ppm), the navigation platform 266 could be instructed to conduct counter-based frequency aiding with an input from the reference clock from the RF transceiver (not shown) in the WAN communications module 221, which is frequency locked to the network wireless frequency, and an uncertainty value may be utilized in this aiding mode, that is indicative of an "uncertainty 6" condition, namely that the compensation tables are not used at all. Having said this, it bears noting that the wireless network coverage area may not always completely overlap areas where GPS signals are available.

In response to such instruction, a pair of built-in frequency counters (not shown) in the navigation platform 266 counts the number of cycles of each of the wireless engine reference clock and the GPS reference input clock signal 267 for a period of time, for example, 2 sec. and estimates the GPS reference clock offset based upon the ratio of the two clock cycle counts, or in other equivalent ways.

Alternatively, the free-running input clock signal 267 could simply be provided without any attempt at providing assistance. In this case, a wider search window will be employed by the navigation platform 266, likely resulting in a longer Time To First Fix.

Test/Production Mode

Figure 9:
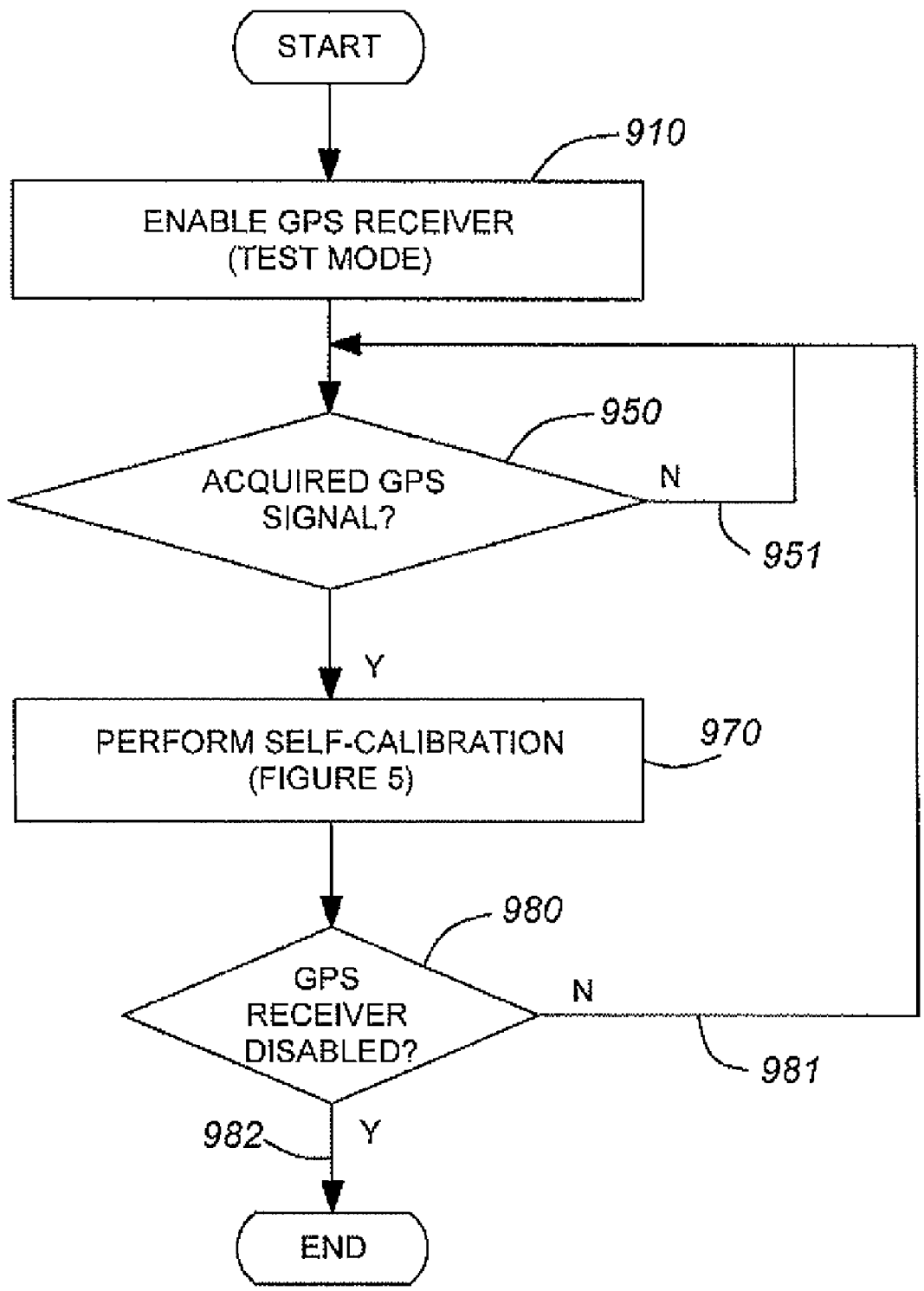
FIG. 9 is a flowchart of operation during a GPS receiver test mode in the example device of FIG. 1.

Turning now to FIG. 9, those having ordinary skill in the art will appreciate that the navigation platform 266 may also provide accurate frequency offset measurements during some production test modes, in which the navigation platform 266 is tracking simulated satellite signals generated by a signal generator, frequency offset information may also be reported periodically, for example, every 3 sec.

When the navigation satellite receiver 260 is reset or powered on in such test mode, the navigation satellite receiver 260 is enabled 910. At periodic intervals, a determination is made as to whether the navigation satellite receiver 260 has successfully acquired the GPS signal. If not 951, it waits until the expiry of the next periodic interval before trying again. Otherwise, it performs self-calibration 970, as described above and shown in FIG. 5. After the self-calibration is complete, resulting in a further update of the compensation tables, a determination is made whether the navigation satellite receiver 260 is disabled 980. If not 981, it proceeds to step 950. If so 982, the processing terminates until the navigation receiver 260 is re-enabled in either acquisition or test mode.

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor; and methods actions can be performed by a programmable processor executing a program of instructions to perform functions of the disclosure by operating on input data and generating output. The disclosure can be implemented advantageously on a programmable system including at least one input device, and at least one output device. Each computer program can be implemented in a high-level procedural or object-oriented programming language, or in assembly or machine language, if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (disclosure-specific integrated circuits), FPGAs (field-programmable gate arrays) and/or DSPs (digital signal processors).

Examples of such types of computer are programmable processing systems contained in the microprocessor 210 and/or navigation satellite receiver 266, suitable for implementing or performing the apparatus or methods of the disclosure. The system may comprise a processor, a random access memory, a hard drive controller, and/or an input/output controller, coupled by a processor bus.

It will be apparent to those having ordinary skill in this art that various modifications and variations may be made to the embodiments disclosed herein, consistent with the present disclosure, without departing from the spirit and scope of the present disclosure.

While preferred embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

Further, the foregoing description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions and other devices.

Moreover, all dimensions described herein are intended solely to be exemplary for purposes of illustrating certain embodiments and are not intended to limit the scope of the invention to any embodiments that may depart from such dimensions as may be specified.

Directional terms such as "upward", "downward", "left" and "right" are used to refer to directions in the drawings to which reference is made, unless otherwise stated. Similarly, words such as "inward" and "outward" are used to refer to directions toward and away from, respectively, the geometric centre of a device, area and/or volume and designated parts thereof.

References in the singular form include the plural and vice versa, unless otherwise noted.

Certain terms are used throughout to refer to particular components. As one skilled in the art will appreciate, manufacturers may refer to a component by different names. It is not intended to distinguish between components that differ in name but not in function.

The purpose of the Abstract is to enable the governing patent office and the public generally, and especially person having ordinary skill in the art, who may not be familiar with patent or legal terms or phraseology, to quickly determine from a cursory inspection, the nature of the technical disclosure. The Abstract is neither intended to define the invention of this disclosure, which is measured by the claims, nor is it intended to be limiting as the claimed scope in any way.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances.

Also, the term "couple" in any form is intended to mean either an direct or indirect connection through other devices and connections.

Other embodiments consistent with the present disclosure will become apparent from consideration of the specification and the practice of the disclosure disclosed herein.

Accordingly, the specification and the embodiments disclosed therein are to be considered exemplary only, with a true scope and spirit of the invention being disclosed by the following claims.

What is claimed is:

1. A navigation satellite receiver comprising:
   a crystal oscillator to generate an input clock signal at an actual frequency which drifts from a nominal frequency over an operable temperature range and within outer bounds;
   a temperature sensor thermally coupled with the crystal oscillator for taking temperature measurements of the crystal oscillator;
   a navigation platform configured to: define a frequency search window, based on first and/or second sets of frequency information, for acquiring a satellite signal having a known transmit frequency, acquire the satellite signal, receive the acquired satellite signal, and determine discrepancies between the actual frequency and nominal frequency of the input clock signal using the received satellite signal; and
   a processor configured to: receive said temperature measurements and said determined discrepancies, produce said first and second sets of frequency information representing outer bounds of the frequency information and indicative of discrepancies between the actual and nominal frequency of the input clock signal associated with the temperature measurements of the crystal oscillator.

2. A navigation satellite receiver according to claim 1, wherein
   the processor is further configured to provide a frequency information estimate derived from the first and/or second sets of frequency information for a current temperature measurement taken by the temperature sensor; and
   wherein the navigation platform is further configured to determine an estimated frequency of the input clock signal used to specify the frequency search window based on the frequency information estimate.

3. A navigation satellite receiver according to claim 2, wherein the frequency information is selected from a group consisting of a frequency, frequency difference, frequency offset, frequency error, frequency difference uncertainty, frequency offset uncertainty and frequency error uncertainty.

4. A navigation satellite receiver according to claim 1, wherein values in the first and second sets of frequency information correspond to a rising temperature trend and a falling temperature trend respectively.

5. A navigation satellite receiver according to claim 1, wherein values in the first and second sets of frequency information correspond to a maximum bound and a minimum bound respectively.

6. A navigation satellite receiver according to claim 1, wherein the receiver is a mobile device.

7. A method for providing frequency aiding information, for an input clock signal generated by a crystal oscillator having an operable temperature range and having an actual frequency which drifts from a nominal frequency across the operable temperature range and within outer bounds, to a navigation platform in a navigation satellite receiver comprising a temperature sensor thermally coupled with the crystal oscillator for taking temperature measurements thereof, the navigation platform for acquiring a satellite signal having a known transmit frequency and receiving the acquired satellite signal, the method comprising the actions of:

in an operational mode,
obtaining frequency data indicative of a discrepancy between the actual frequency and the nominal frequency of the input clock signal using the received satellite signal;
taking a contemporaneous temperature measurement of the crystal oscillator; and
associating the frequency data with the contemporaneous temperature measurement and updating first and/or second sets of frequency information therewith, the first and second sets of frequency information representing respective outer bounds of the frequency information; and in an acquisition mode,
taking a current temperature measurement of the crystal oscillator; and
using data stored in said first and/or second sets of frequency information and associated with the current temperature measurement in defining a frequency search window for acquiring the satellite signal.

8. A method according to claim 7, wherein using data stored in said first and/or second sets of frequency information and associated with the current temperature measurement in defining said frequency search window further comprises:
deriving a frequency information estimate from the first and/or second sets of frequency information associated with the current temperature;
determining an estimated frequency of the input clock signal used to specify the frequency search window, based on the frequency information estimate.

9. A method according to claim 7, wherein the frequency information is selected from a group consisting of a frequency, frequency difference, frequency offset, frequency error, frequency difference uncertainty, frequency offset uncertainty and frequency error uncertainty.

10. A method according to claim 7, further comprising identifying whether the contemporaneous temperature measurement of the crystal oscillator is indicative of a rising temperature trend and falling temperature trend respectively and wherein values in the first and second sets of frequency information correspond to a rising temperature trend and a falling temperature trend respectively.

11. A method according to claim 7, wherein the first and second sets of frequency information are initialized to a value indicative of an untrained status.

12. A method according to claim 11, wherein,
the action of associating the frequency data with the contemporaneous temperature measurement comprises identifying whether the contemporaneous temperature measurement is indicative of a temperature trend;
on a condition of no identified temperature trend, replacing any untrained value in either or both of the first and second sets of frequency information having a temperature index corresponding to the contemporaneous temperature measurement, with the frequency data; and
on a condition of an identified temperature trend, updating an entry, in a selected one of the first and second sets of frequency information corresponding to the identified trend, and having a temperature index corresponding to the contemporaneous temperature measurement, based upon the frequency data.

13. A method according to claim 12, wherein the action of updating an entry comprises identifying whether the frequency data lies between a stored value in each of the first and second sets of frequency information having a temperature index corresponding to the contemporaneous temperature measurement, and if so, substituting an updated value which slowly converges to the frequency data, and if not, substituting an updated value which rapidly converges to the frequency data.

14. A method according to claim 13, wherein the action of substituting an updated value which slowly converges to the frequency data and the action of substituting an updated value which rapidly converges to the frequency data each comprise calculating the stored value and a difference between the frequency data and the stored value, weighting the difference by a coefficient, adding the stored value thereto to produce a sum and substituting the sum for the stored value.

15. A method according to claim 14, wherein the coefficient in the action of substituting a value which slowly converges to the frequency data is small in relation to the coefficient in the action of substituting a value which rapidly converges to the frequency data.

16. A method according to claim 14, wherein the coefficient is a divisor which is an exponent of 2.

17. A method according to claim 8, wherein the action of determining an estimated frequency of the input clock signal further comprises providing an uncertainty factor indicative of a perceived uncertainty in the estimated frequency information.

18. A method according to claim 8, wherein the action of deriving the frequency information estimate comprises providing a value, corresponding to at least one of the first and second sets of frequency information, that is not untrained, chosen from a group consisting of:
at least one first value in the at least one of the first and second sets of frequency information, and having a temperature index corresponding to the current temperature measurement;
at least one value, interpolated from among values in the at least one of the first and second sets of frequency information, and in proximity to one of the first values that is untrained;
at least one value in the at least one of the first and second sets of frequency information, and in proximity to one of the first values that is untrained; and
at least one value in the at least one of the first and second sets of frequency information.

19. A method according to claim 18, wherein the action of providing a value comprises multiplying the value corresponding to the first set of frequency information by a weighting constant in the range of [0,1], multiplying the value corresponding to the second set of frequency information by a difference from 1 of the weighting constant and adding the multiplied values.

20. A computer readable medium in a processor, in a navigation satellite receiver, comprising:
a crystal oscillator to generate an input clock signal at an actual frequency which drifts from a nominal frequency over an operable temperature range and within outer bounds;
a temperature sensor thermally coupled with the crystal oscillator for taking temperature measurements of the crystal oscillator;
a navigation platform for acquiring a satellite signal having a known transmit frequency, receiving the acquired satellite signal and generating frequency data indicative of discrepancies between the actual frequency and nominal frequency of the input clock signal using the received satellite signal;

the medium having stored thereon, computer-readable and computer-executable instructions which when executed by the processor, cause the processor to perform acts comprising:
  in an operational mode, receiving the frequency data indicative of discrepancies between the actual frequency and the nominal frequency of the input clock signal;
    receiving a contemporaneous temperature measurement of the crystal oscillator; and
    associating the frequency data with the temperature measurement and updating first and/or second sets of frequency information therewith, the first and second sets of frequency information representing respective outer bounds of the frequency information; and
  in an acquisition mode, receiving a current temperature measurement of the crystal oscillator; and
    using data stored in said first and/or second sets of frequency information and associated with the current temperature measurement, deriving a frequency information estimate for use by the navigation platform in defining a frequency search window for acquiring the satellite signal.

* * * * *